(12) United States Patent
Wijsman et al.

(10) Patent No.: US 6,260,252 B1
(45) Date of Patent: *Jul. 17, 2001

(54) METHOD AND APPARATUS FOR ASSEMBLING OR DISASSEMBLING AN INSTALLATION PRESENT ON A SEABED

(75) Inventors: Jacobus Cornelis Wijsman, Rijnsburg; Robert Paul Hovinga, Naaldwijk, both of (NL)

(73) Assignee: Allseas Group S.A. (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,327
(22) PCT Filed: Oct. 24, 1995
(86) PCT No.: PCT/NL96/00415
  § 371 Date: Jul. 21, 1997
  § 102(e) Date: Jul. 21, 1997
(87) PCT Pub. No.: WO97/15773
  PCT Pub. Date: May 1, 1997

(30) Foreign Application Priority Data

Oct. 25, 1995 (NL) .................................................. 1001497

(51) Int. Cl.[7] ............................. B23P 19/00; B25B 21/00
(52) U.S. Cl. ........................ 29/426.1; 29/525.02; 29/452; 81/57.14
(58) Field of Search .............................. 29/426.1, 525.02, 29/452; 81/57.14

(56) References Cited

U.S. PATENT DOCUMENTS 4,569,258 * 2/1986 Orban .
4,832,530 * 5/1989 Andersen et al. ..................... 29/237

* cited by examiner

Primary Examiner—P. W. Echols
(74) Attorney, Agent, or Firm—Mark Zovko

(57) ABSTRACT

The invention relates to a method for assembling and disassembling an installation present on a seabed, for instance a pipeline lying on a seabed, wherein components, for instance pipe flanges, are mutually attached by means of nut and bolt connections and the nut and bolt connections are released and/or secured by means of a wrench. Nut and bolt connections are herein released by divers using a wrench. This is heavy and difficult work. It is impossible for divers to operate at considerable depth. Complicated and very costly pipeline connections are then applied which can be released and secured without divers. The invention has for its object to reduce the stated drawbacks of the known method. To this end at least one wrench is used, of which an engagement cup for engaging a nut and/or a bolt head in axial direction of a nut and bolt connection for manipulating is displaceable relative to a cup carrier counter to spring action.

11 Claims, 26 Drawing Sheets

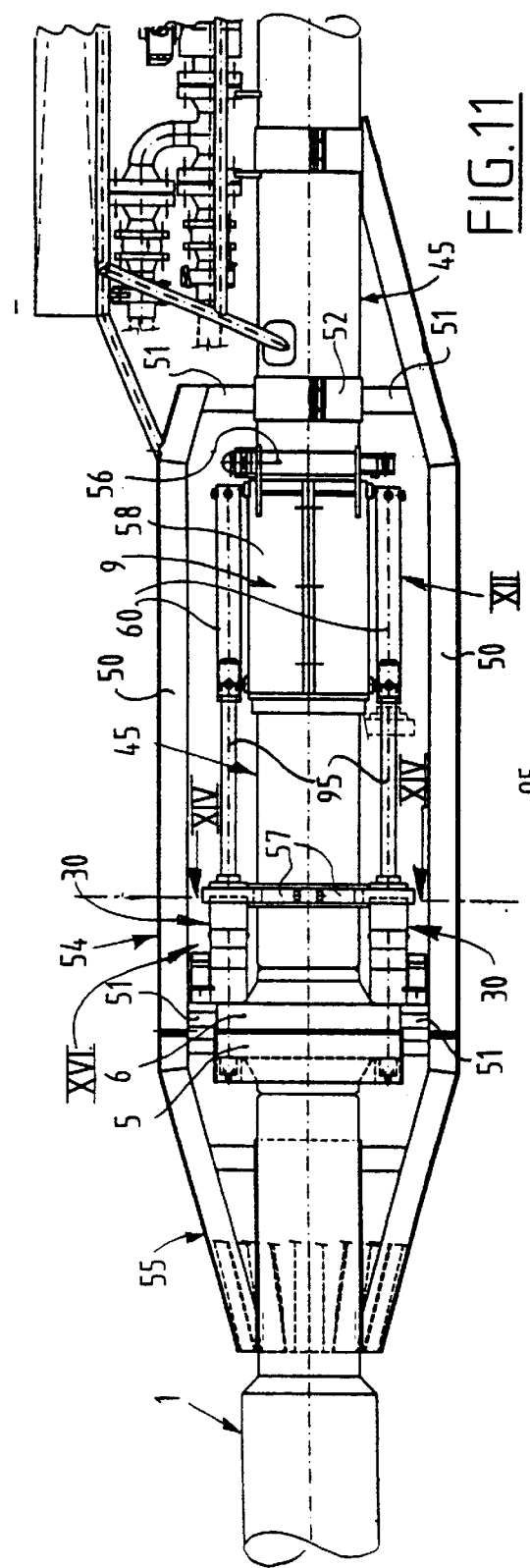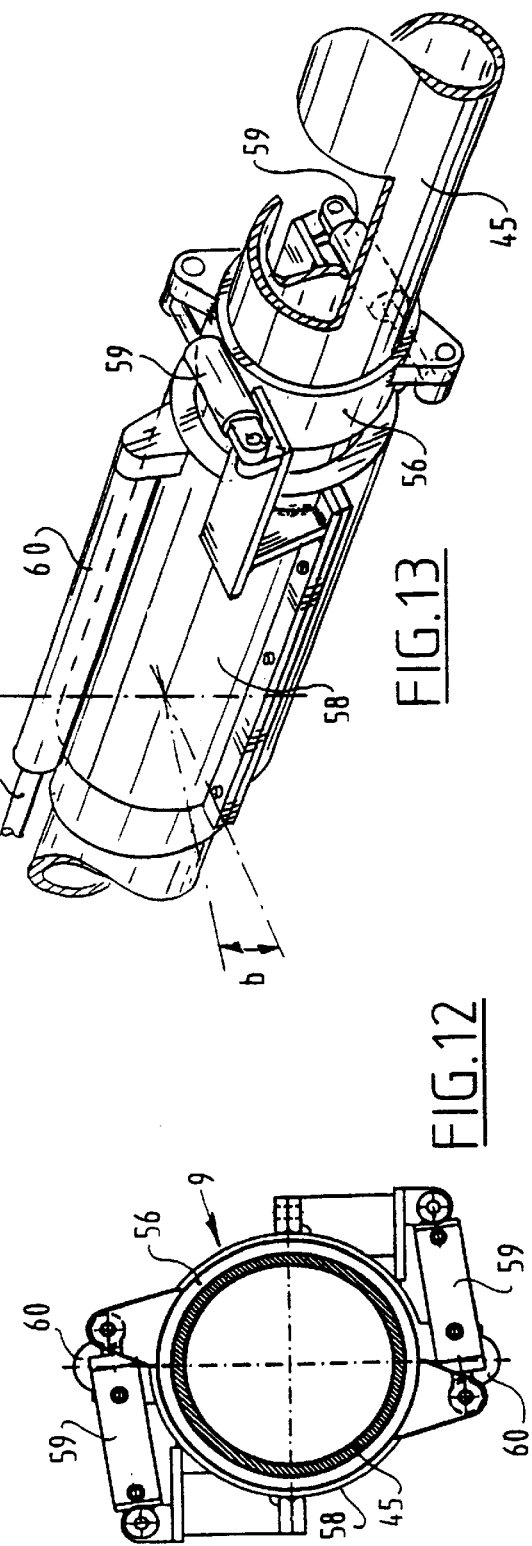
FIG.11
FIG.13
FIG.12

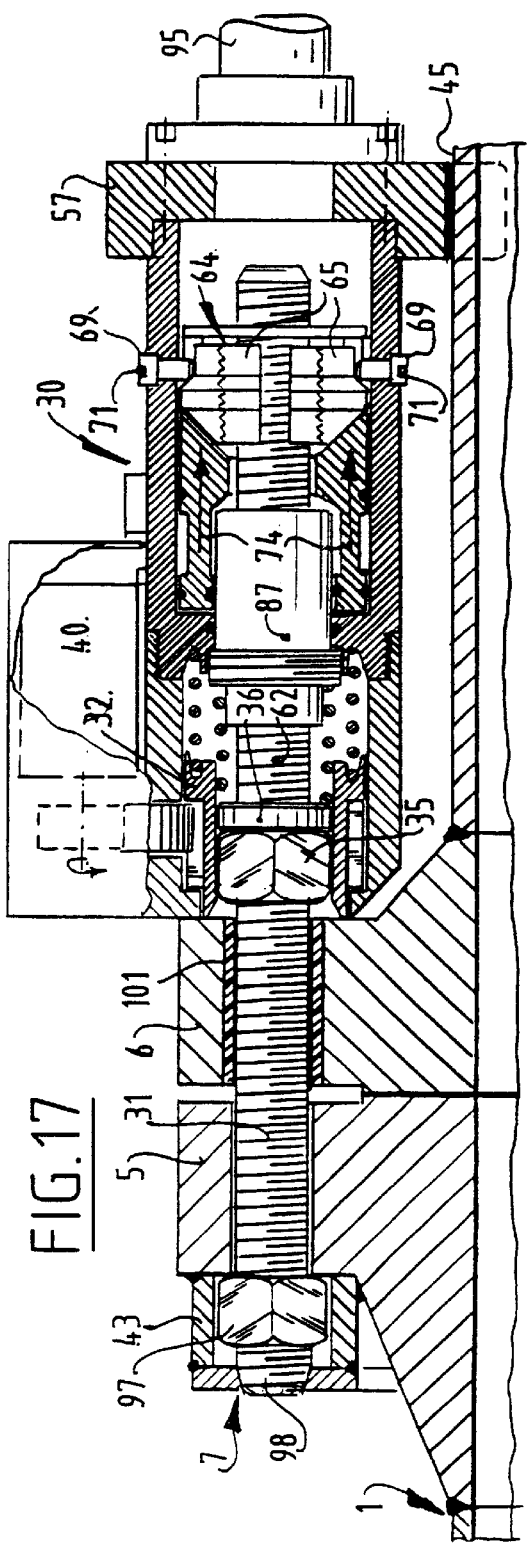
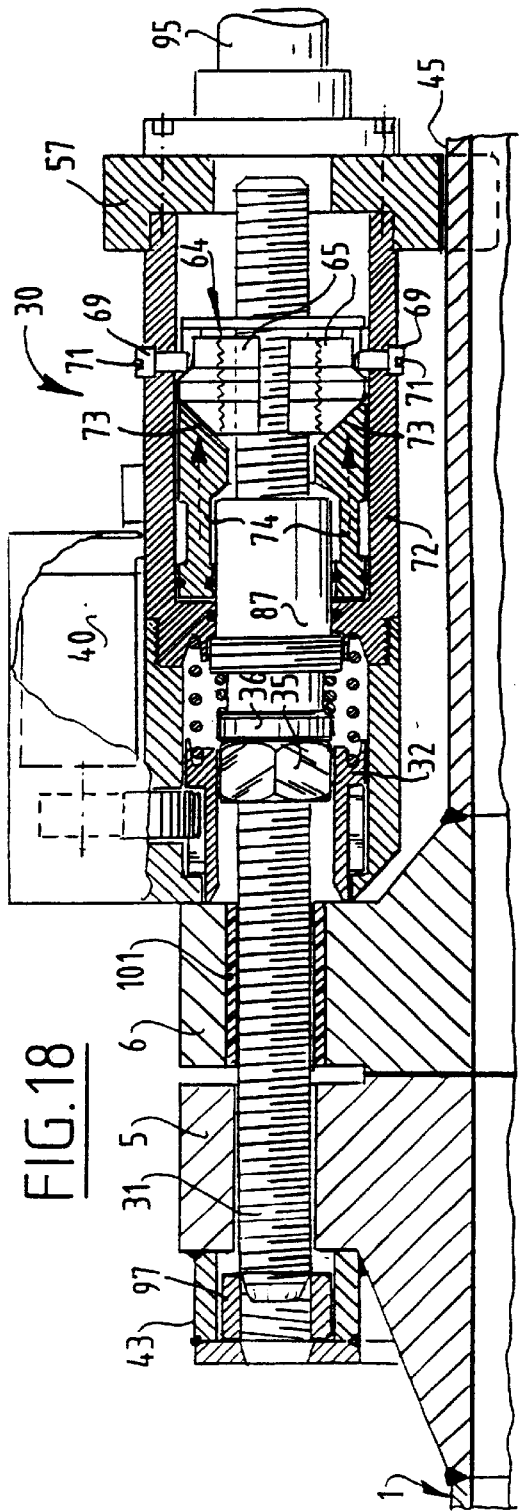

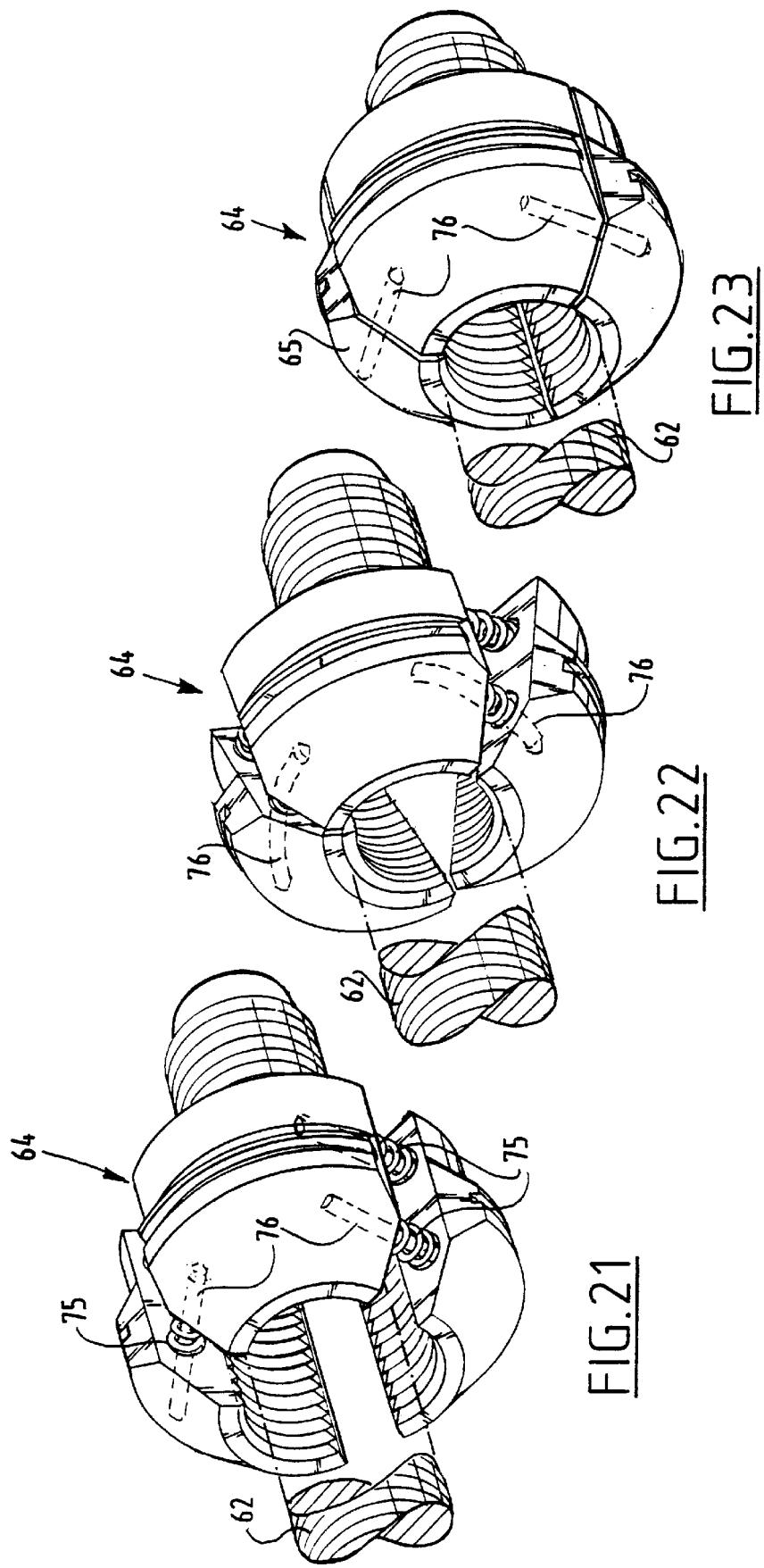

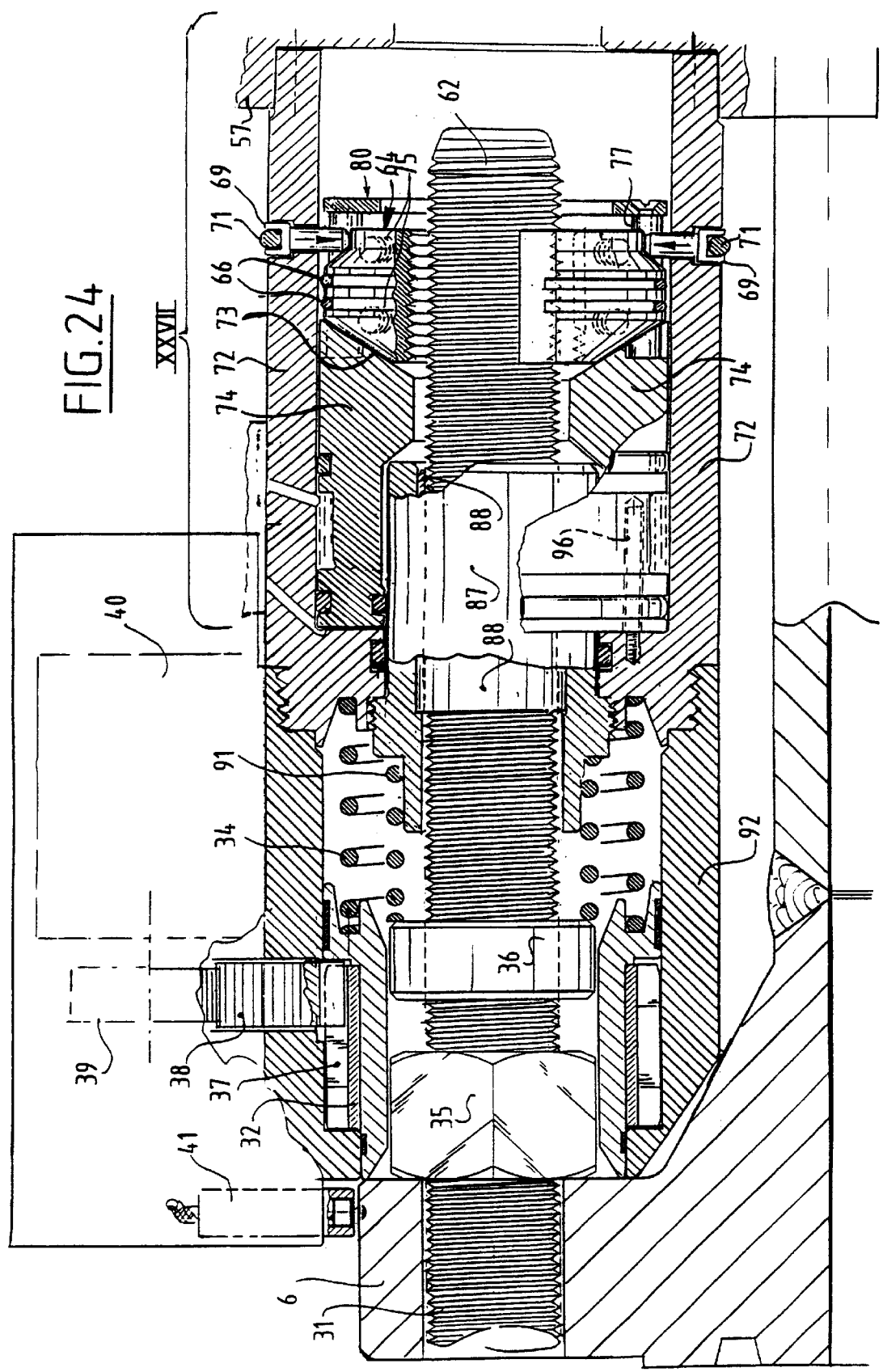

METHOD AND APPARATUS FOR ASSEMBLING OR DISASSEMBLING AN INSTALLATION PRESENT ON A SEABED

The invention relates to a method for assembling or disassembling a pipeline on a seabed. Nut and bolt connections are herein released by divers using a wrench. This is heavy and difficult work. It is impossible for divers to operate at considerable depth. Complicated and very costly pipeline connections are then applied which can be released and secured without divers.

The invention has for its object to reduce the stated drawbacks of the known method. To this end the invention provides an improved method and apparatus herein described.

In addition to use on pipelines lying on the seabed the method according to the invention can also be applied to drilling rigs, oil or gas extraction wells or other constructions located under water.

The invention will be elucidated in the description following hereinbelow with reference to a drawing. In the drawing in schematic form:

FIG. 11 shows on larger scale a side view of fraction XI of FIG. 7;

FIGS. 12 and 13 show respectively a cross section and a perspective view of fraction XII of FIG. 11;

FIGS. 16A, 16B and 17–19 show on larger scale a longitudinal section through fraction XVI of FIG. 11 in successive stages;

FIGS. 21–23 show a perspective view of fraction XX in different positions;

FIG. 24 shows on larger scale a longitudinal section of another embodiment of fraction XXVI of FIG. 16;

In the following description corresponding components of different embodiments are provided with the same reference numerals, also when they have a different design.

Figure 1:
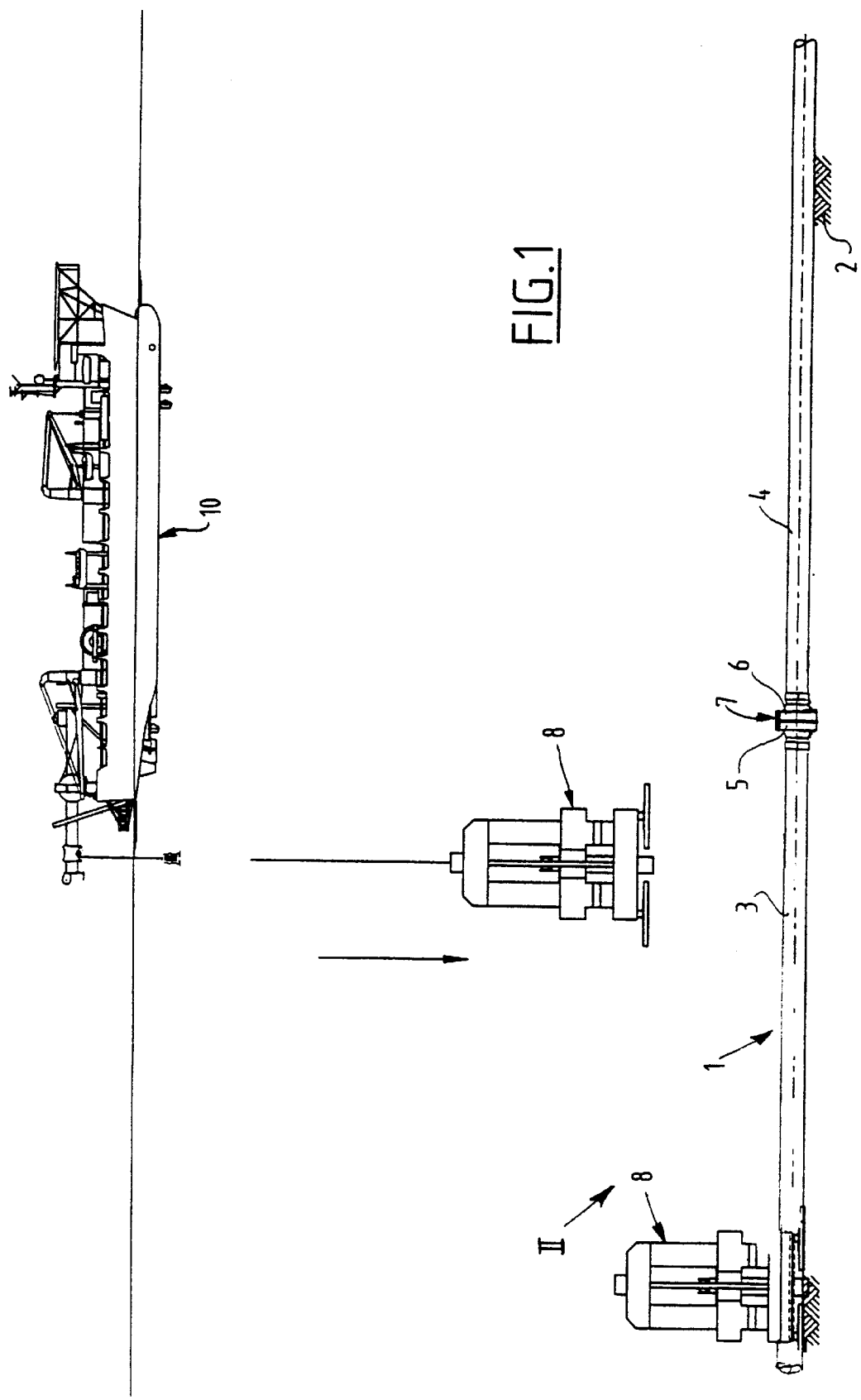
FIG. 1 shows a side view of a pipeline with auxiliary equipment.
Figure 2:
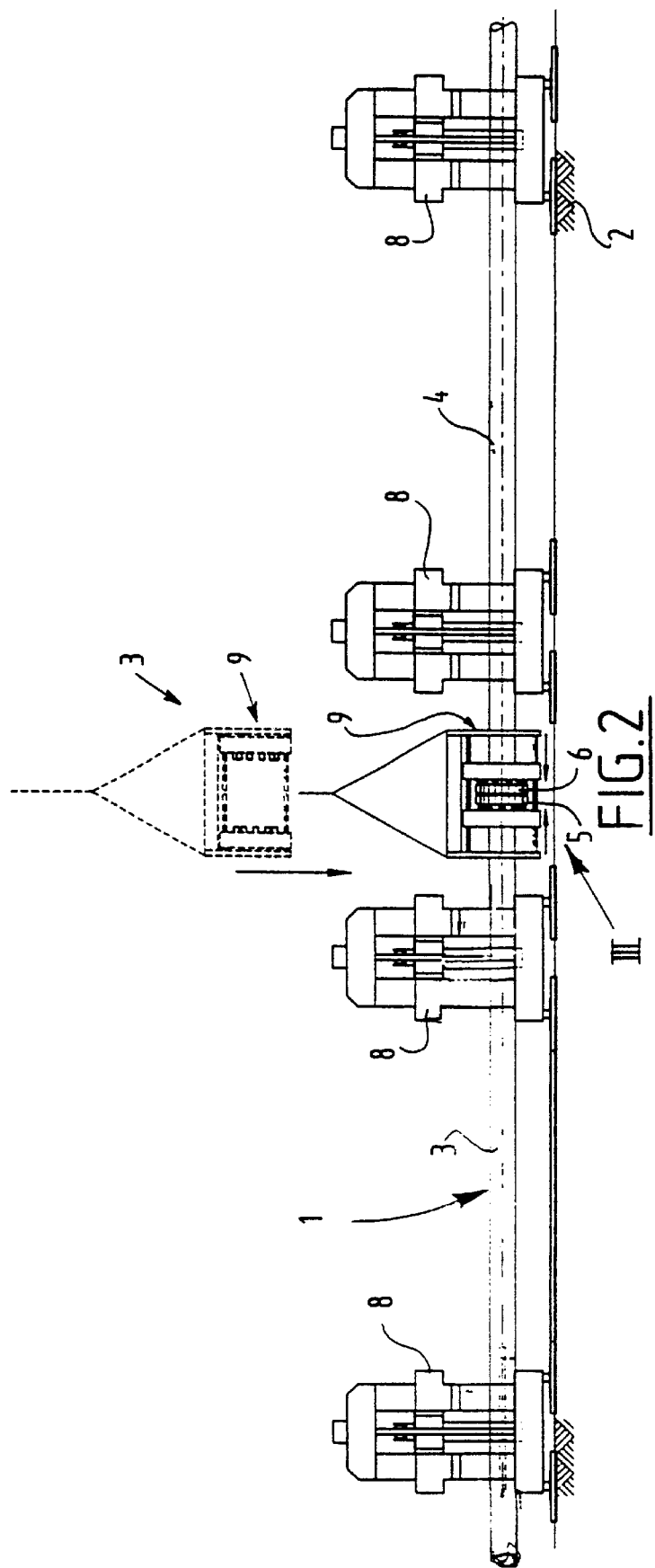
FIG. 2 shows fraction II of FIG. 1 at a later stage.

A pipeline 1 which lies on a seabed 2 at a great depth, for instance at between 1 and 3 km depth, has at least two elements 3 and 4 which are mutually connected by means of flanges 5 and 6 which are mutually fixed by means of nut and bolt connections 7. If element 4 must be released from element 3 the pipeline 1 is first raised from the seabed 2 by means of per se known yokes 8 which are lowered round pipeline 1 from a vessel 10, whereafter pipeline 1 is raised locally by means of yokes 8. From the vessel 10 a tool carrier 9 is then arranged at the flanges 5, 6 on pipeline 1 (FIG. 2).

Figure 3:
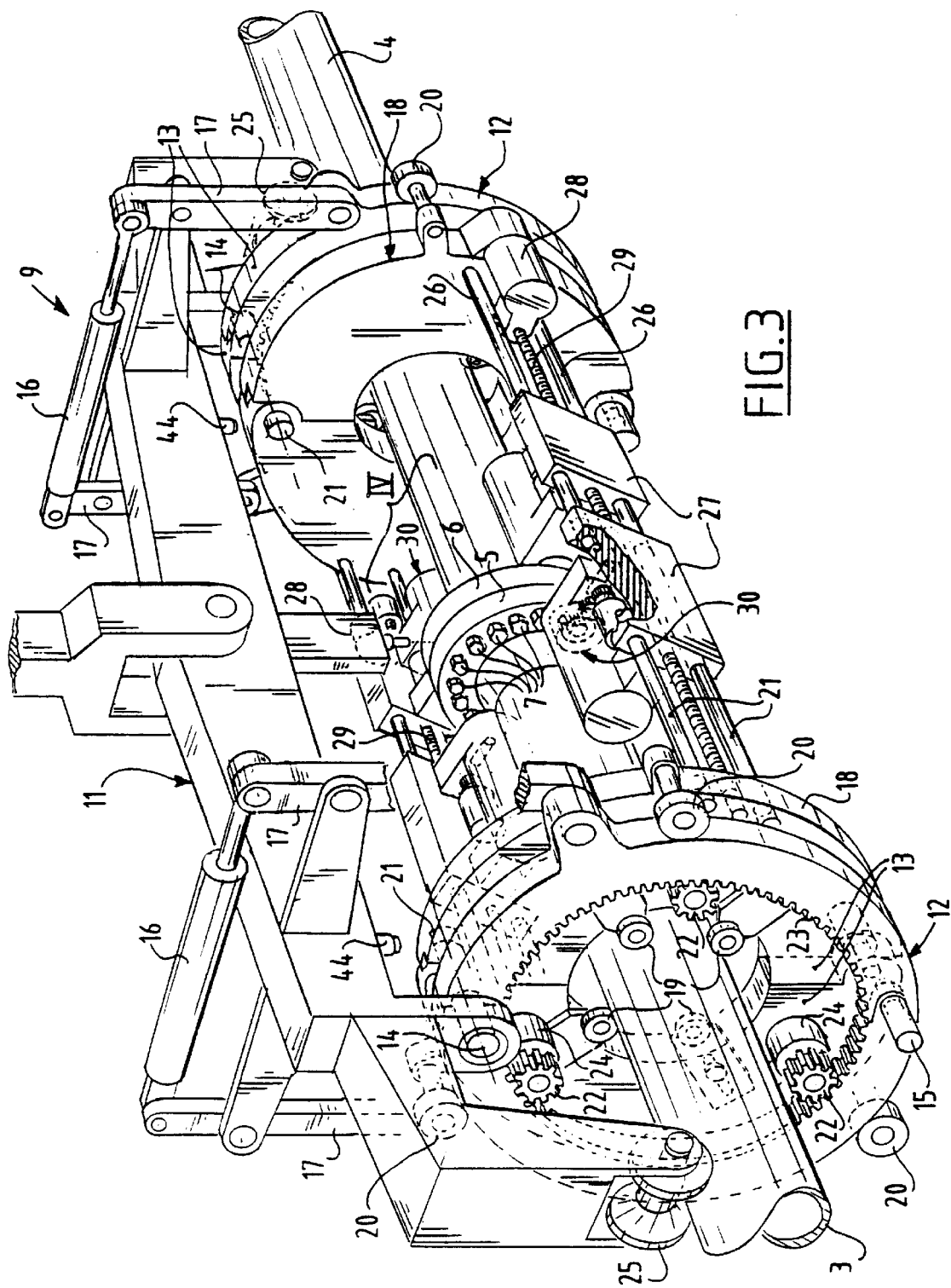
FIG. 3 shows on larger scale a perspective view of fraction III of FIG. 2.

The tool carrier 9 (FIG. 3) comprises a support yoke 11 which carries on either side a divided ring 12, of which the ring halves 13 are pivotable mutually on an axis 14 and pivotable relative to support yoke 11 by means of a hydraulic cylinder 16 and pivot arms 17 and are closable by means of a hydraulic closure 15. A divided ring 18 is rotatably mounted on each divided ring 12 by means of inner rollers 19 and outer rollers 20. Rings 12 and 18 can only be opened together in order to be arranged round a pipeline 1 provided that the shafts 21 of rings 18 and the axes 14 of rings 12 are arranged coaxially. This is sensed with a sensor 44 which is arranged on support frame 11 and which determines the presence locally of the shaft 21. Rings 18 can rotate relative to rings 12 by means of toothed pinions 22 of rings 18 which are driven by hydraulic motors 24 and engage in inner gear rims 23 of rings 12. The support yoke 11 can be moved in lengthwise direction of pipeline 1 by means of rollers 25. Rings 18 are mutually connected by means of longitudinal rods 26 which guide consoles 27 driven in opposite directions by motors 28 via screw spindles 29 on either side of flanges 5, 6. Two or more wrenches 30 supported by consoles 27 are for instance arranged over mutual angular distances which correspond with angular distances between the screw bolts 31 of nut and bolt connections 7.

Figure 4:
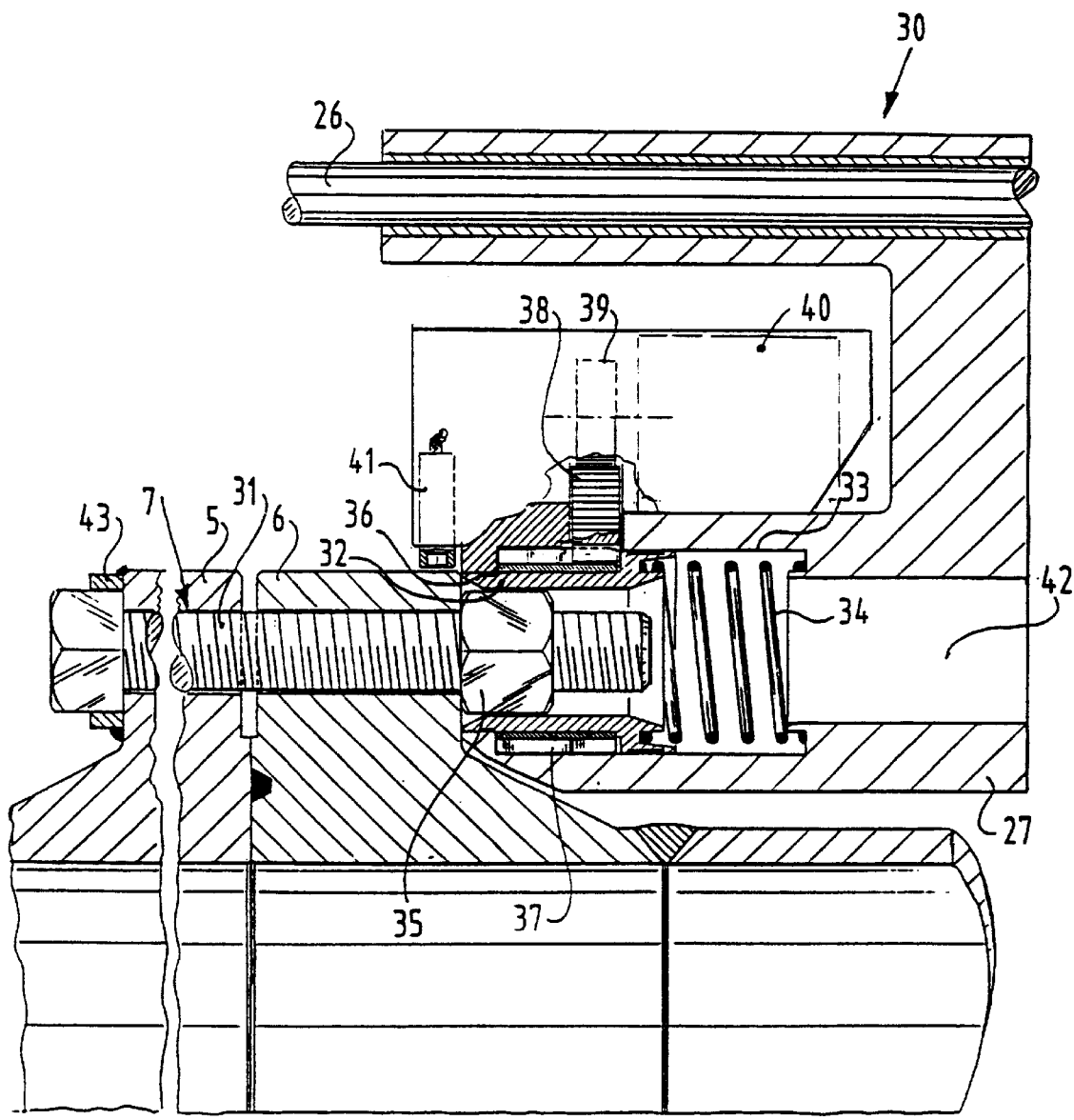
FIG. 4 shows on larger scale a longitudinal section of fraction IV of FIG. 3.
Figure 5:
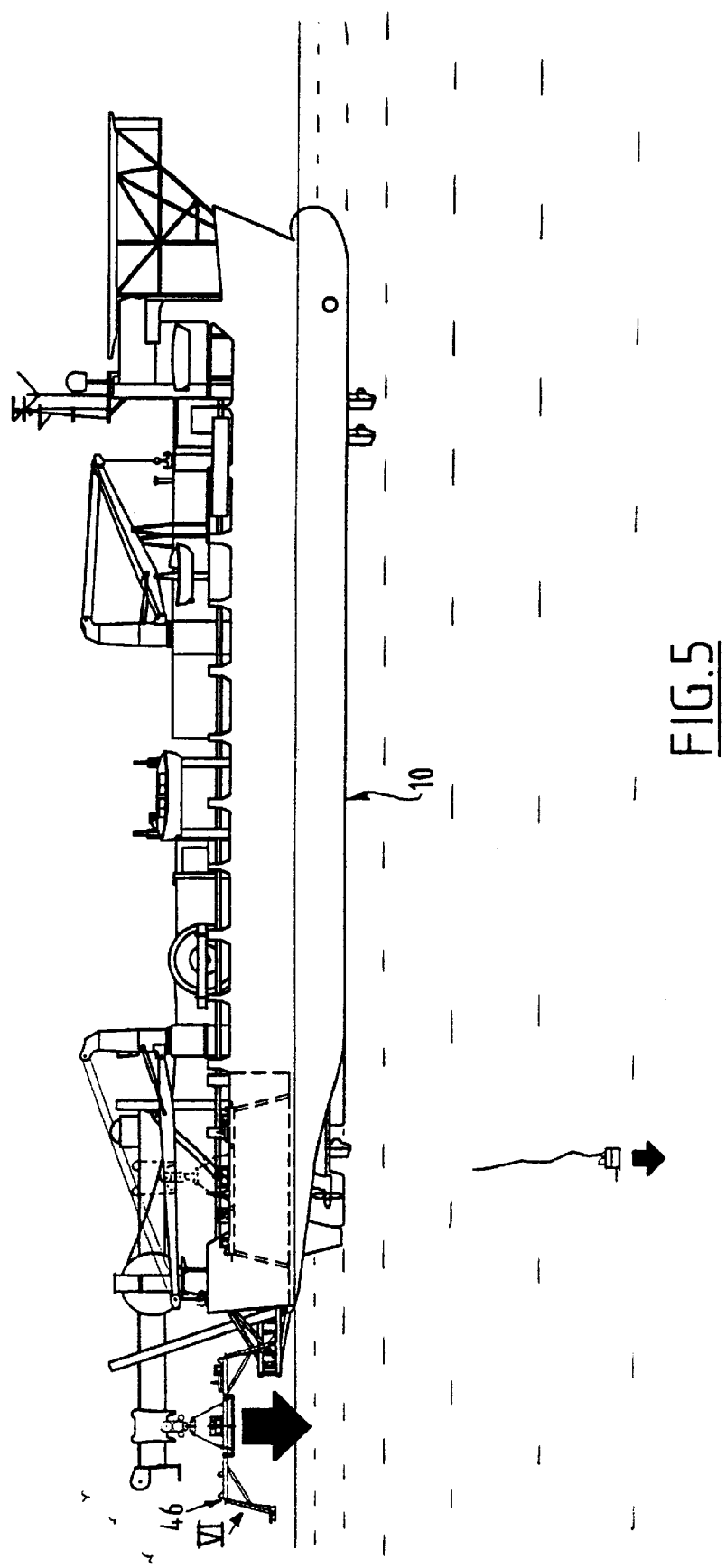
FIG. 5 shows a side view of auxiliary equipment for another pipeline.
Figure 6:
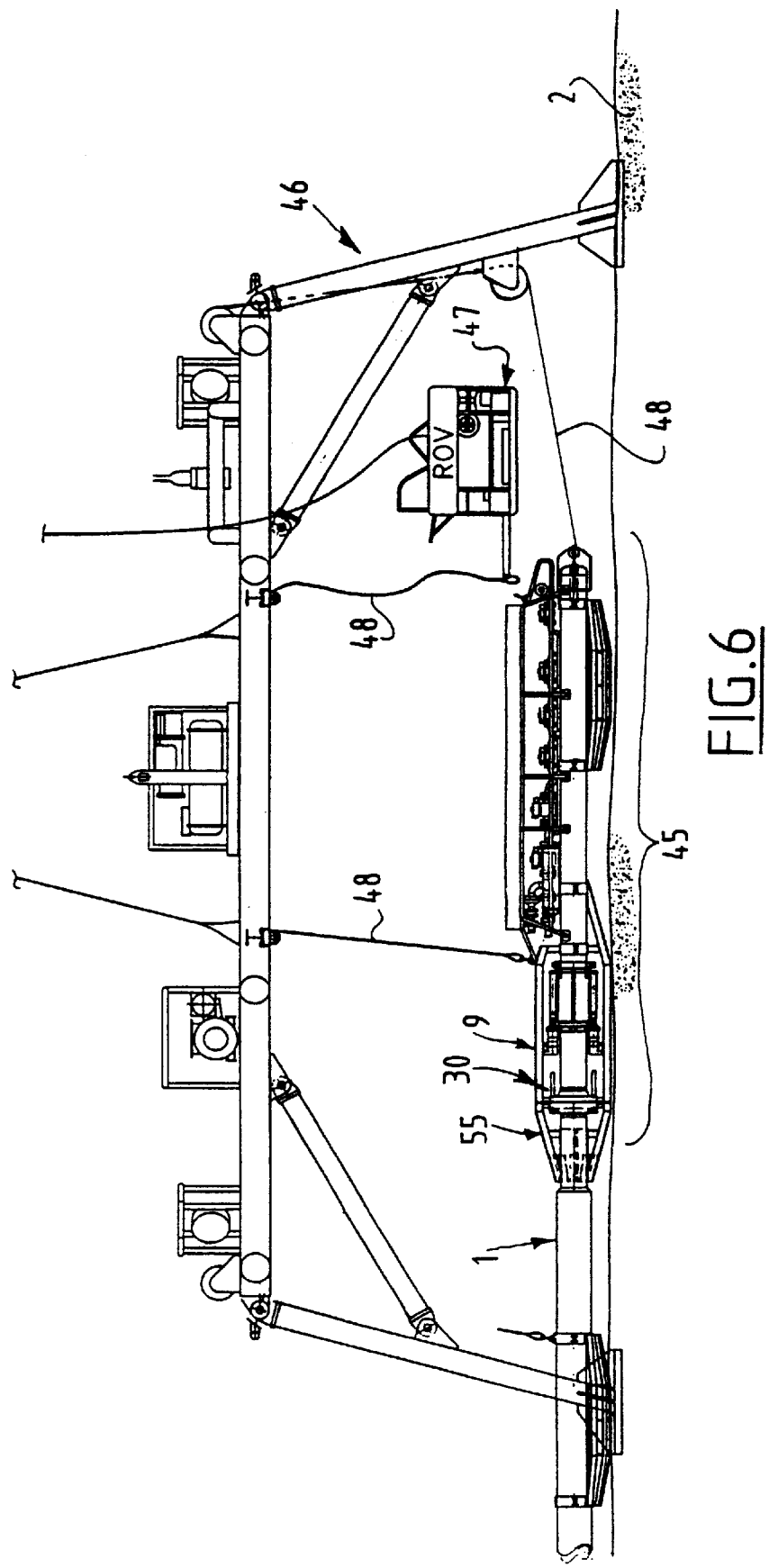
FIGS. 6–10 show on larger scale fraction VI of FIG. 5 during manipulating of a pipeline in successive stages.
Figure 7:
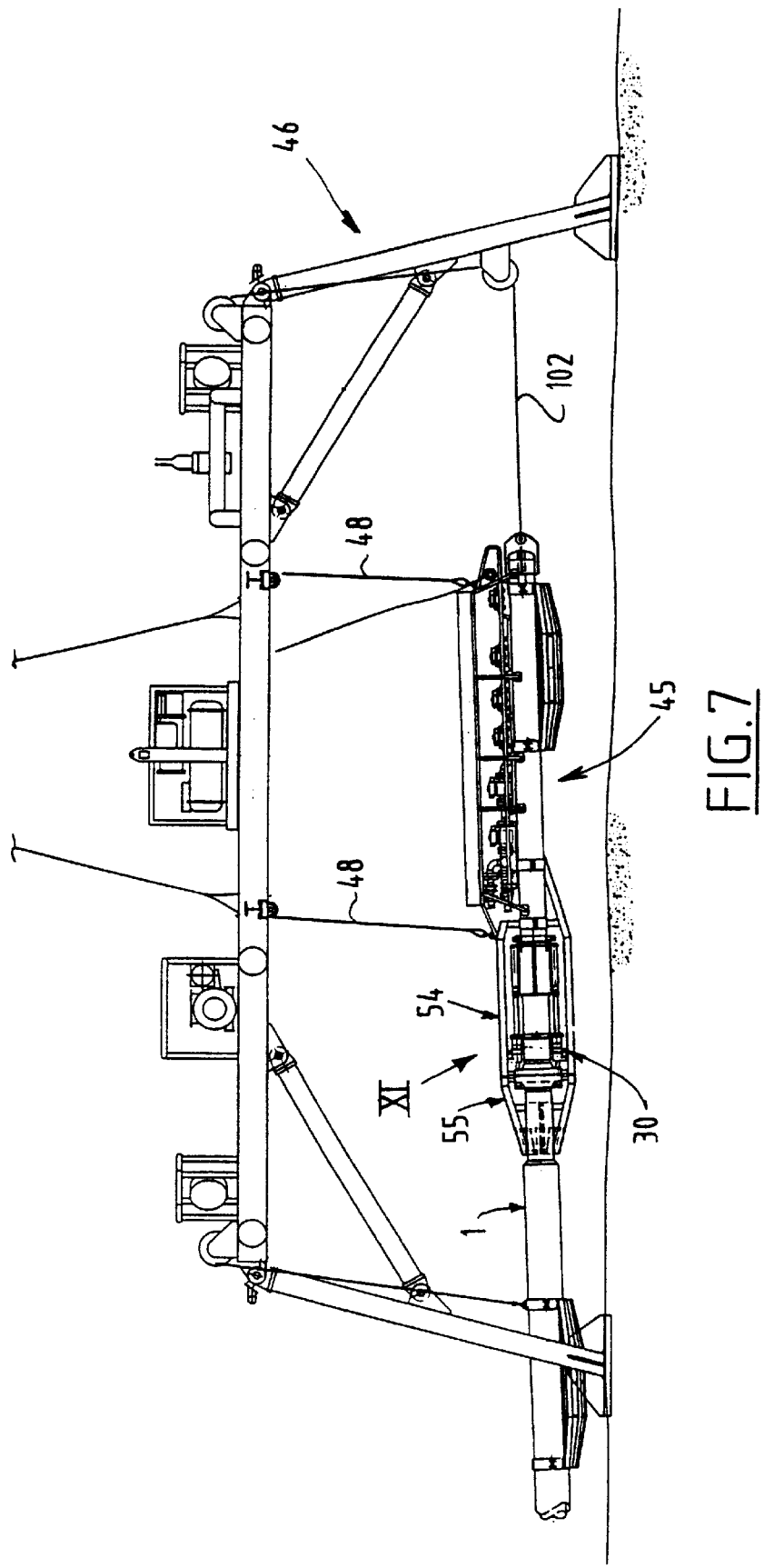
Figure 8:
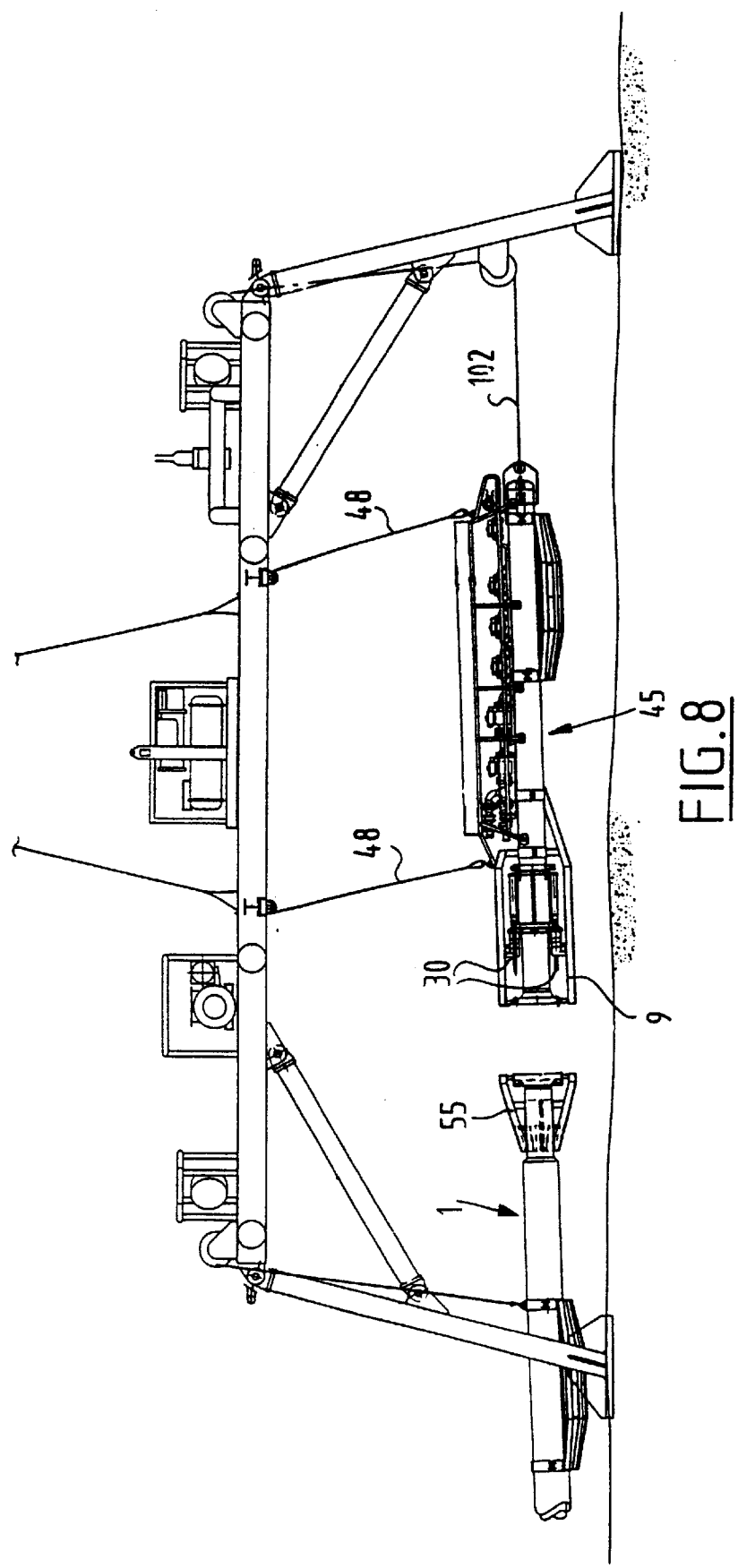
Figure 9:
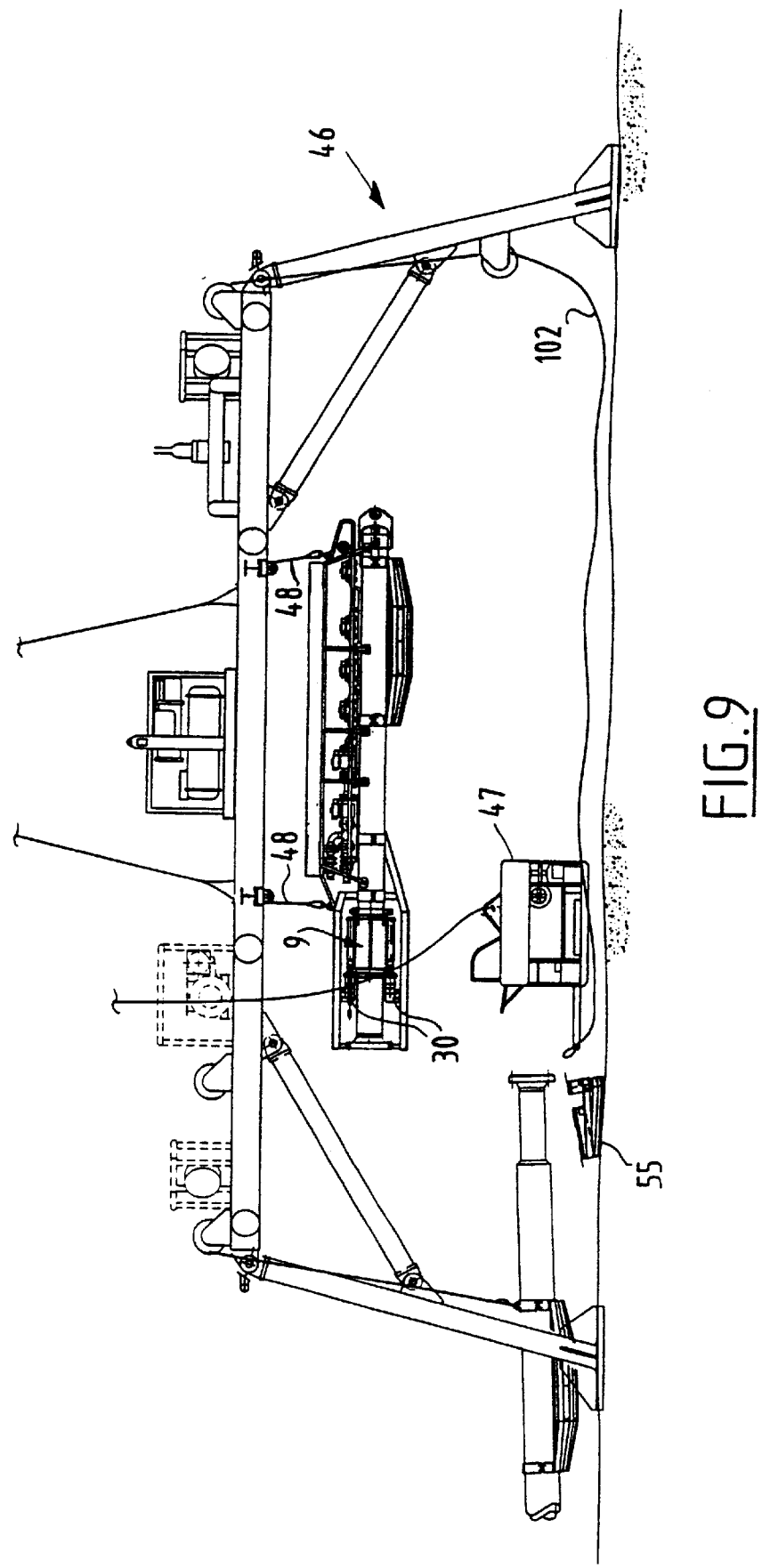
Figure 10:
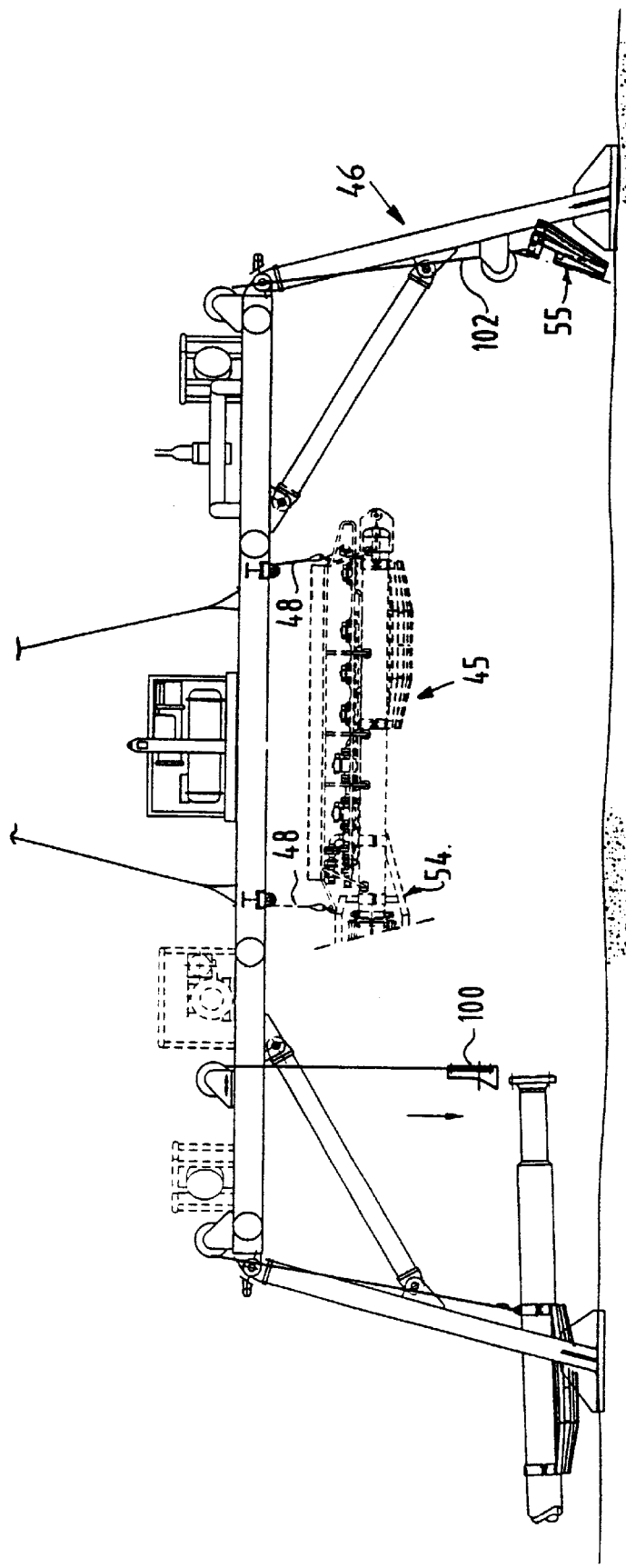

When a wrench 30 is displaced opposite a nut and bolt connection 7 using a sensor 41 and has approached this sufficiently (FIG. 4), a socket 32 which is pressed on by a pressure spring 34 and guided in a bore 33 and which forms an engagement cup is pushed over the nut 35 of nut and bolt connection 7. The socket 32 has a positioning edge 36 and an outer gear ring 37 which is driven via tooth wheels 38 and 39 by a hydraulic motor 40 in order to loosen the nuts 35. The unscrewed nuts 35 slide outside through the spring 34 and a hole 42, while the bolt 31 which is locked against rotation by a hexagonal socket 43 is later pulled out by means of an ROV (remote operated vehicle) with a tool, for instance a magnet or a gripper, after the support yoke 11 with wrenches 30 has been removed.

Figure 16A:
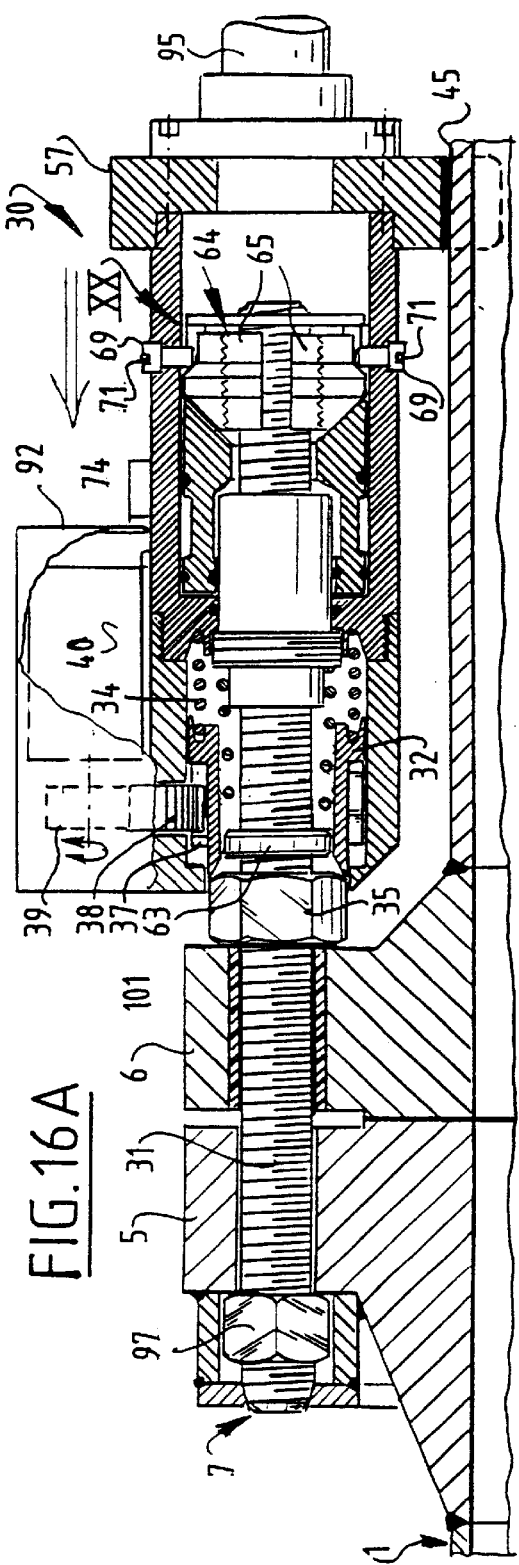
Figure 16B:
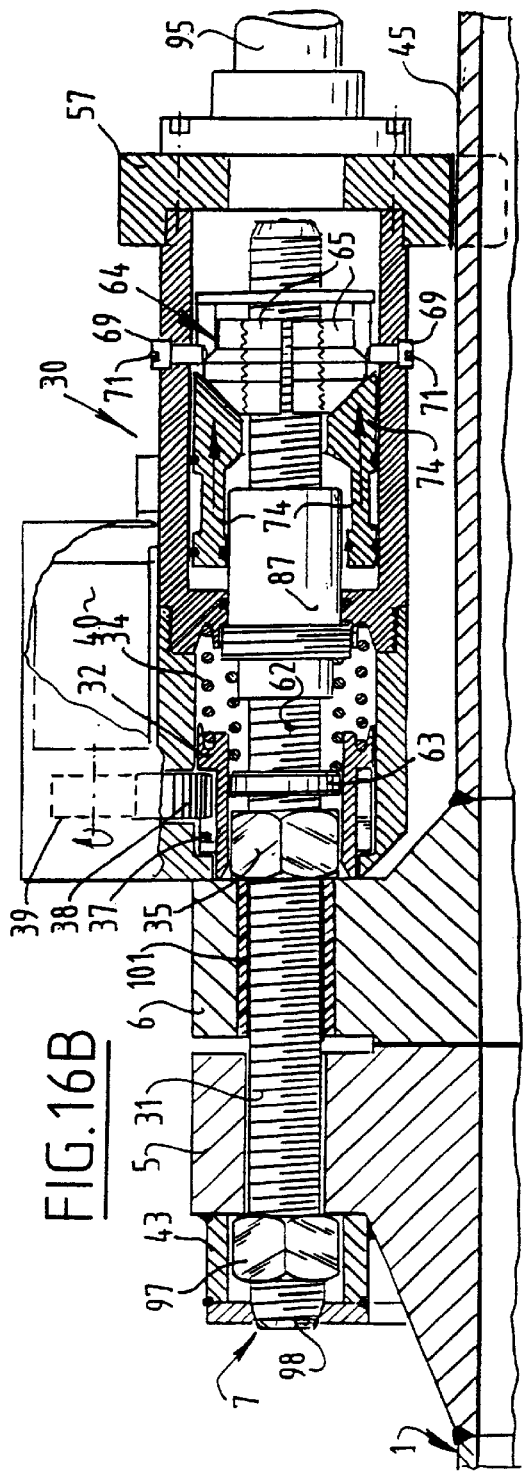
Figure 19:
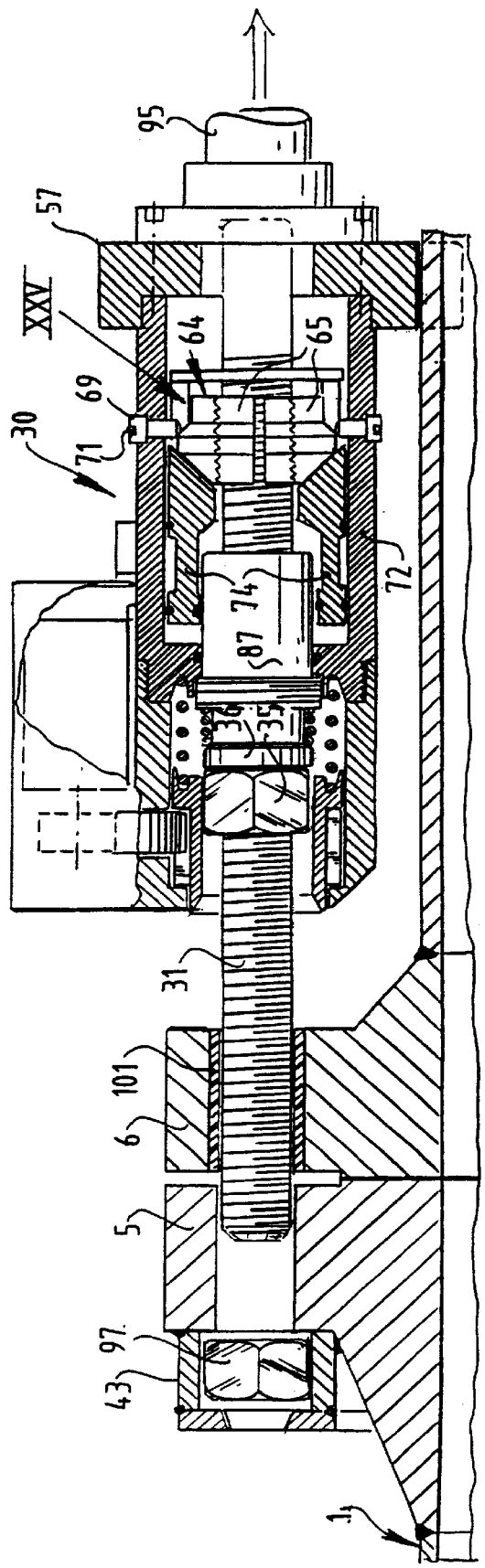
Figure 20:
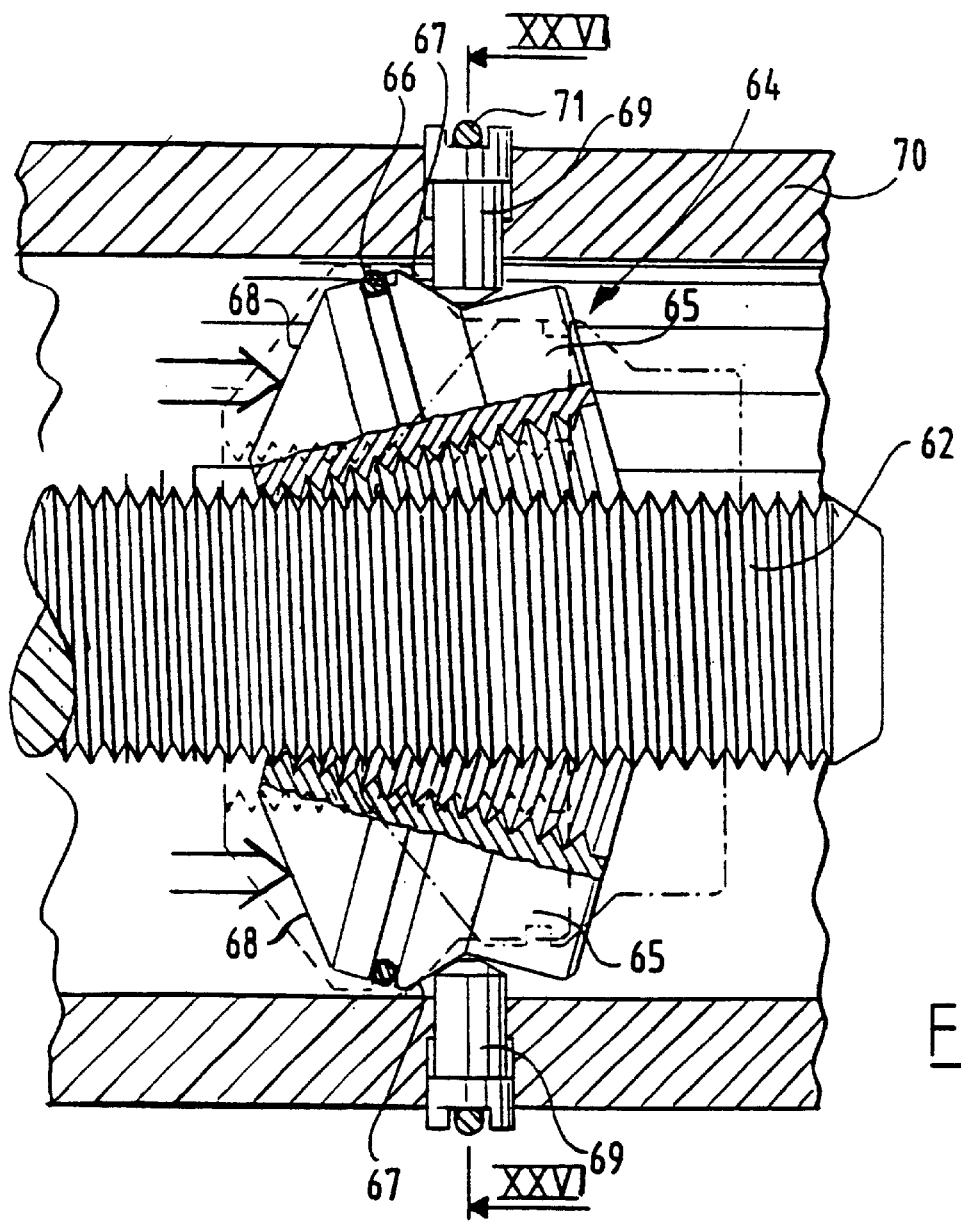
FIG. 20 shows on larger scale a longitudinal section through fraction XX of FIG. 16A.
Figure 25:
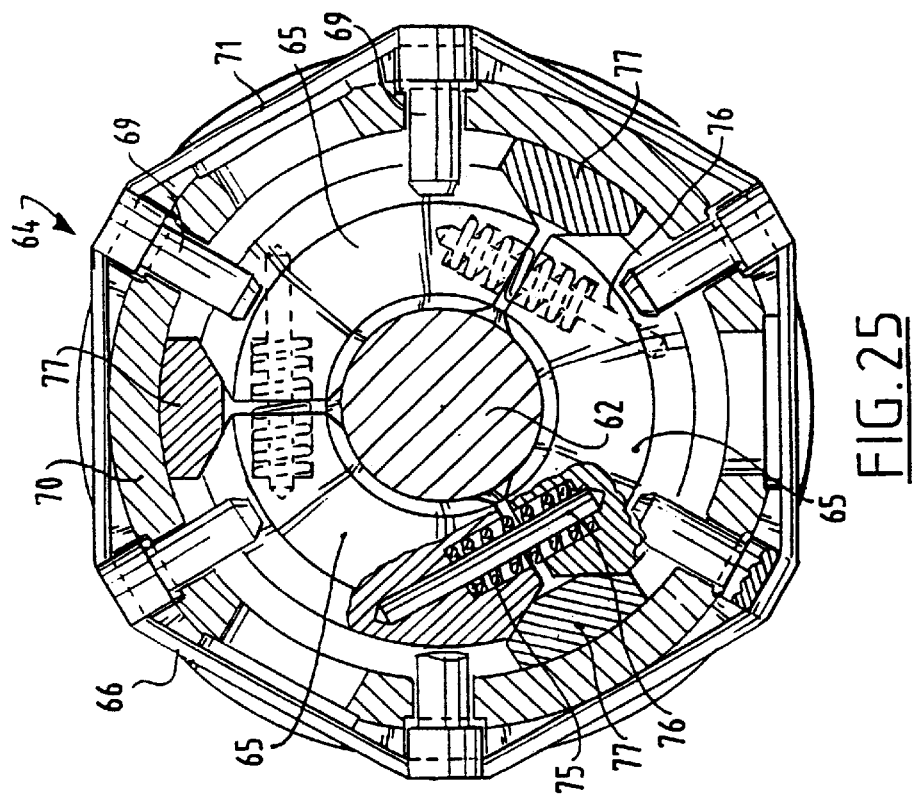
FIGS. 25 and 26 show cross sections along line XXV—XXV of FIG. 19 in different positions.
Figure 26:
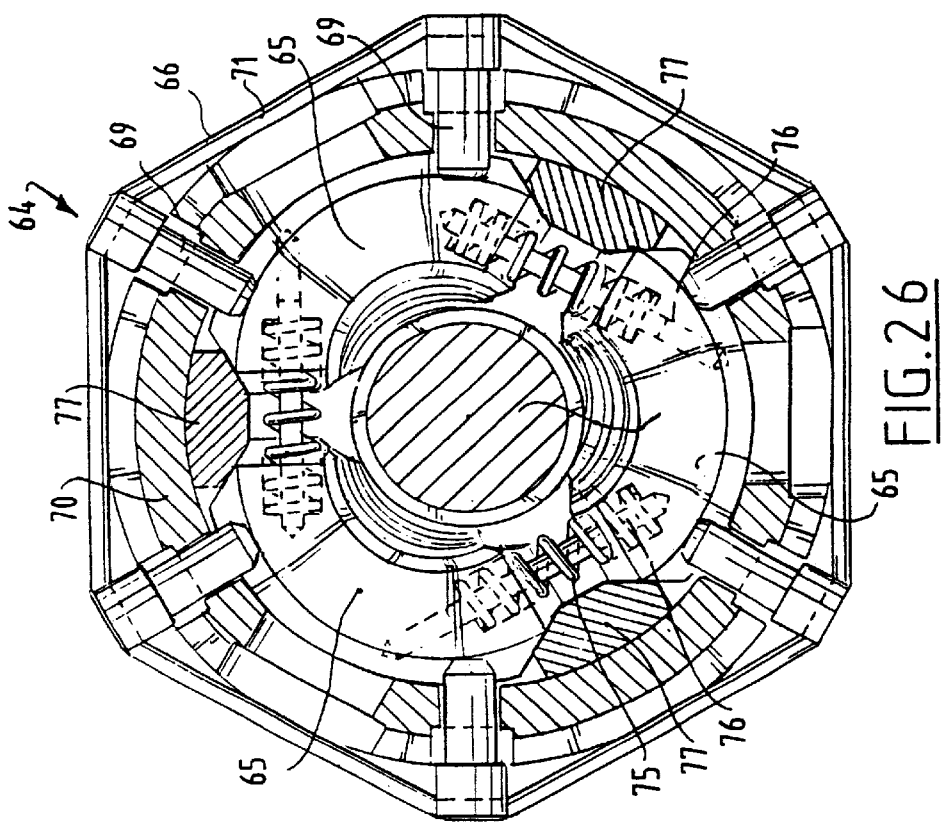
Figure 27:
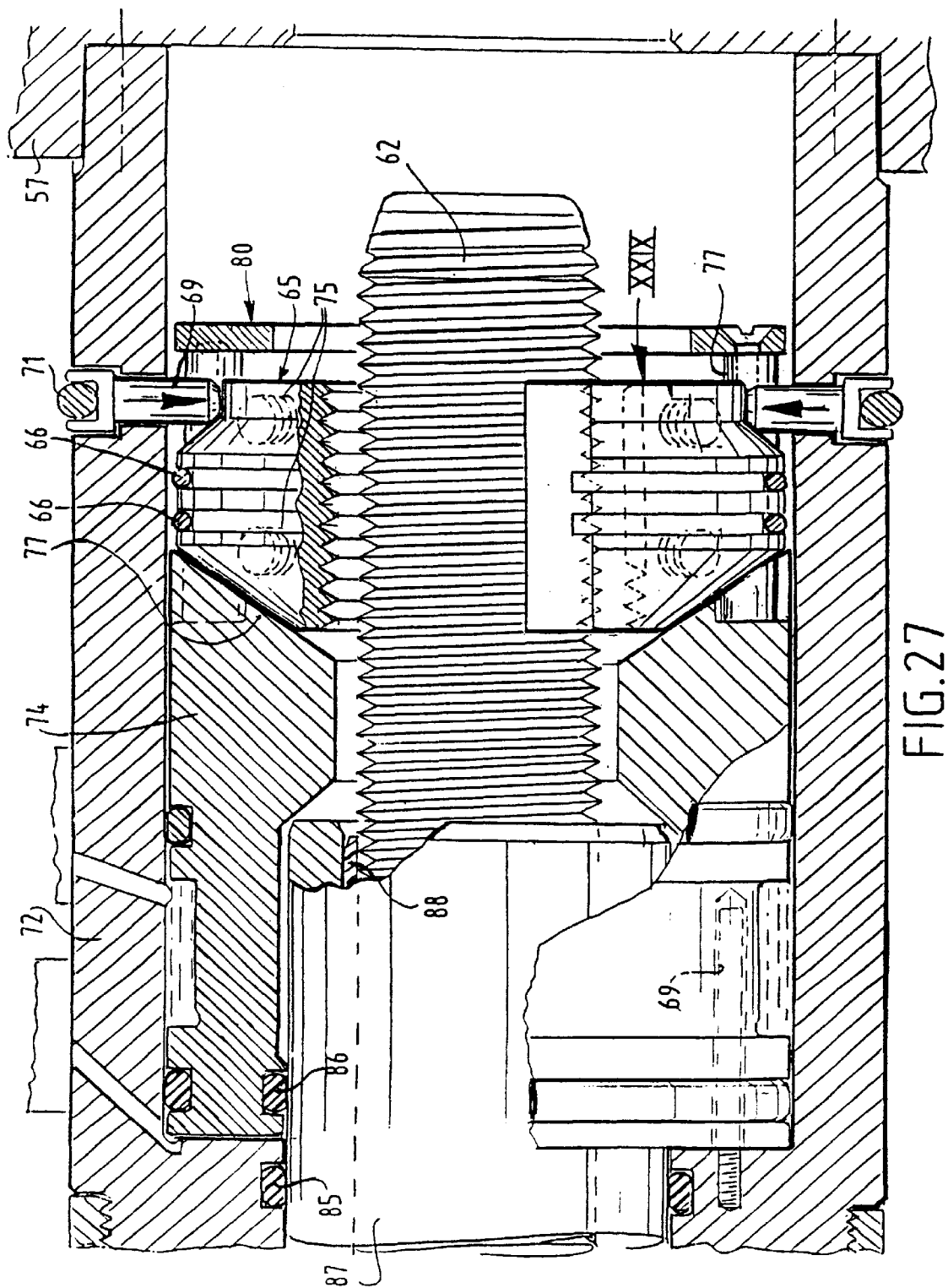
FIGS. 27 and 28 show on larger scale fraction XXVII of FIG. 24 in different positions.
Figure 28:
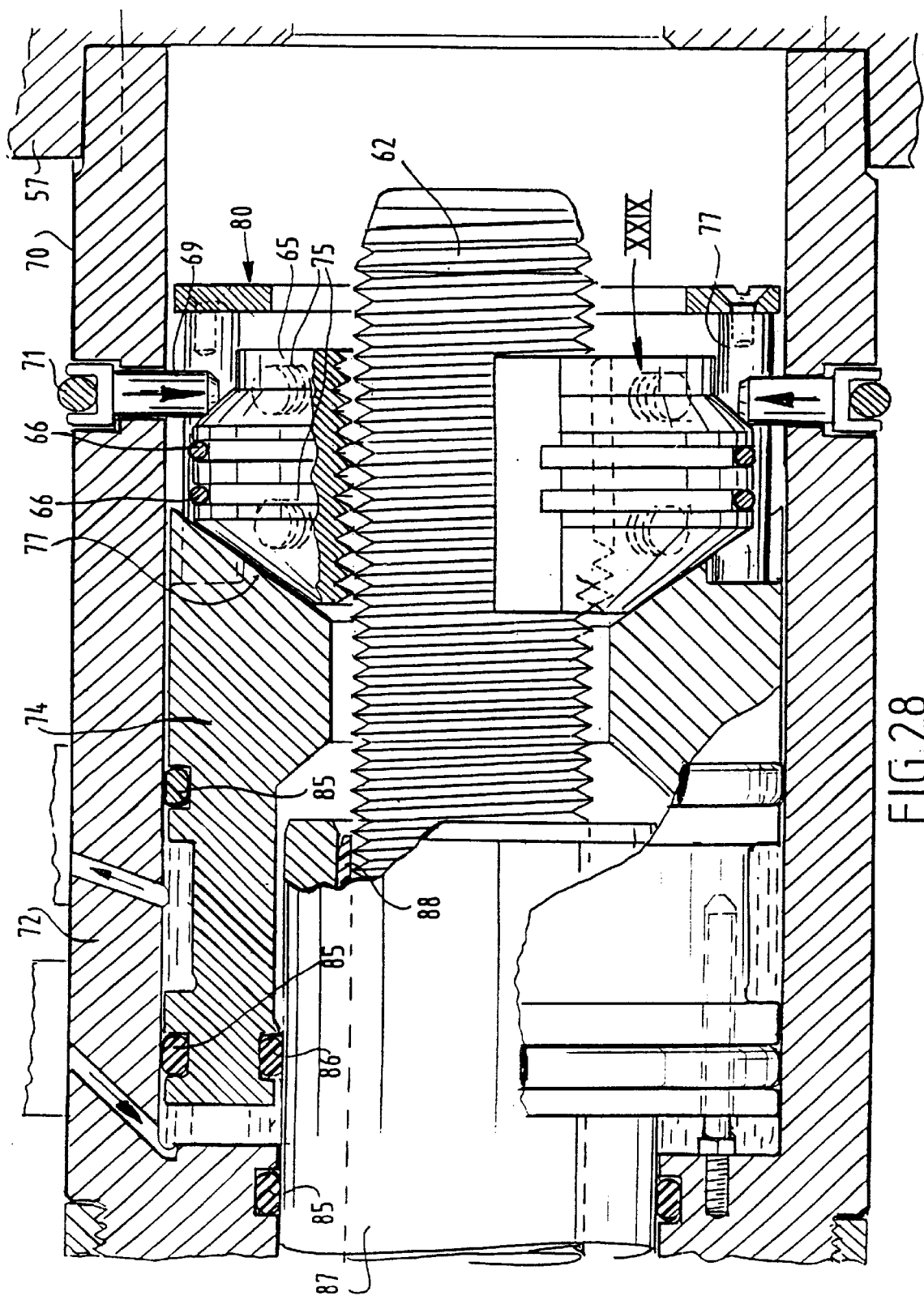

According to FIGS. 5–10 a pipe piece 45 is removed from a pipeline 1. For this purpose a lifting frame 46 is lowered from a vessel 10 onto the seabed 2 round the pipe piece 45 and pipe piece 45 is hooked on lifting cables 48 of lifting frame 46 with the use of an ROV 47 (remote operated vehicle). After raising of pipeline 1 from the seabed 2 the nut and bolt connections 7 of flanges 5, 6 are released by means of wrenches 30 carried by a tool carrier 9 which is arranged round pipe piece 45 inside a cage 54. This latter has longitudinal beams 50 which are fixed via radial supports 51 to the flange 6 and a clamping ring 52 clamped round pipe piece 45. This cage 54 supports axially against a cage-like, two-part pipe support 55. The tool carrier 9 comprises in this case a ring 57 guided round the pipe piece 45 of pipeline 1 and a sleeve 56 guided round the pipe piece 45 which are arranged rotatably relative to a ring 58 clamped round the pipe piece 45. The ring 57 carries a plurality of wrenches 30 distributed over the periphery, this at mutual angular distances a which are equal to twice the angular distance b between the nut and bolt connections 7. The angular position of sleeve 56 is adjusted through an angle b by means of hydraulic cylinders 59 which are arranged between ring 58 and sleeve 56 (FIG. 13). Ring 57 is slidable axially relative to sleeve 56 by means of hydraulic cylinders 60 with piston rods 59. Each wrench 30 comprises said socket 32 which is urged by means of a spring 34 from the position drawn in FIG. 16A to the position drawn in FIG. 16B onto the nut 35 and which is driven via its gear rim 37 and tooth wheels 38, 39 by a hydraulic motor 40. Each screw bolt 31 has in FIGS. 16–19 a protruding threaded end 62 having a fixed ring 63 a small distance from nut 35. Clamped onto the free end of threaded end 62 in the fitted position of FIG. 16 is a clamp 64 consisting of a plurality of, for instance three, clamping pieces 65 which are pressed together to form a closed threaded ring by means of an elastic peripheral ring 66 (FIG. 20). The clamping pieces 65 have conical surfaces 67 and 68. Surfaces 67 co-act with radial pins 69 which are slidable in a housing 70 and which are urged inward by an elastic ring 71. Surfaces 68 co-act with a conical ring 73 which is connected to the piston 74 of a hydraulic cylinder 72. Clamping pieces 65 are urged apart by tangential pressure springs 75 arranged in each of the separating surfaces and a tangential flexible pin 76 arranged therebetween (FIGS 21–23). In the embodiment variant of FIGS. 24–28 two elastic peripheral rings 66 are present and pins 76 are disposed coaxially of the pressure springs 75. Clamping pieces 65 are guided outward by means of their guide surfaces 78 and axially directed conical guide pieces 77 of a cage 80 which is fixed by means of bolts 79 to the conical ring 73.

The cylinder housing 70 and its piston 74 are sealed with sealing rings 85 and 86 relative to a sliding sleeve 87 which is guided over threaded end 62 by means of a plastic lining 88 and which supports via a pressure spring 91 against the fixed ring 63 (FIG. 24).

The driving gear housing 92 of motor 40 and tooth wheels 38 and 39 is fixed to cylinder 72. The piston 74 is locked against rotation by means of axial rods 96.

The operation of wrenches 30 is as follows. Wrenches 30 are built on in the position of FIG. 16 and thus lowered together with pipeline 1 and pipe piece 45 onto the seabed 2, wherein the hexagonal socket 43 is arranged round each nut 97 and provided with a ring 99 adapted to the conical end 98. The clamps 64 are in their clamping position and flanges 5, 6 are locked between the tightened nuts 97 and 35. A socket 32 of a wrench 30 is situated round half the plurality of nuts 35 (FIG. 14).

In this situation the remotely controlled hydraulic motor 40 is driven in order to loosen nuts 35 so that they come up against rings 63. Clamps 64 are then released by an axial inward movement of pistons 74 whereby the clamping pieces 65 displace radially outward (FIG. 17). The nuts 35 are then rotated further together with screw bolts 31 until the nut 97 is fully released. In the case the pipe piece 45 must be removed in transverse direction the cylinders 60 with their piston rods 95 are operated to pull the screw bolts 31 out of flanges 5 with the clamps 64 closed as according to FIG. 19, so that they still remain in flanges 6 and are there held in place by means of nylon clamping bushes 101. When pipe piece 45 can be removed in axial direction the wrenches 30 are pulled off the screw bolts 31 from the position of FIG. 18 by means of piston rods 95 with the clamps 64 released.

Figure 15:
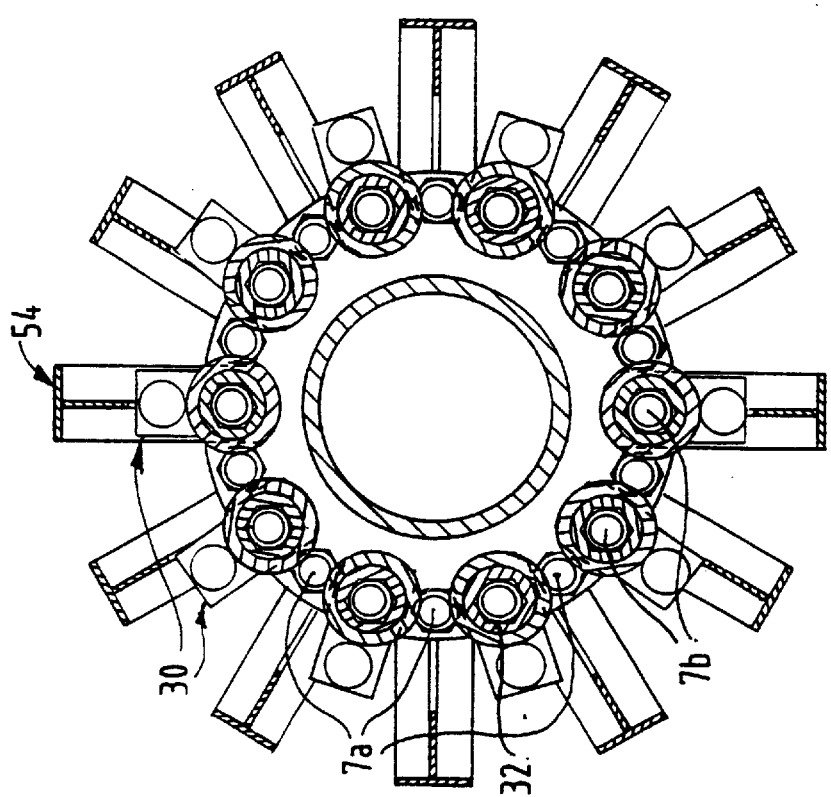
FIGS. 14 and 15 show the cross section XIV—XIV of FIG. 11 in two different positions.
Figure 14:
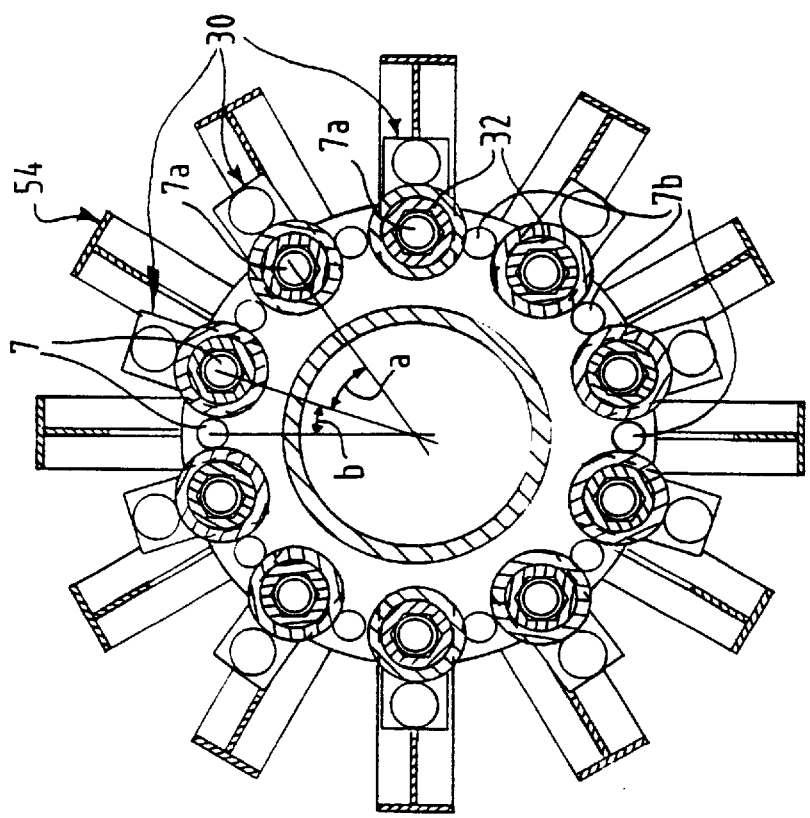

For the purpose of loosening screw bolts 31 which are still fixed and situated between the loosened screw bolts 31, the wrench 8 is displaced by means of cylinders 59 from the position of FIG. 14 to the position of FIG. 15 over an angular distance b and wrenches 30 are pushed over screw bolts 31 with fixed nuts 35, wherein the sockets 32 optionally compress the pressure springs 34 and slide over these nuts 35 at their first rotation.

When this second set of screw bolts 31 has also been sufficiently loosened and optionally retracted, the pipe piece 45 is pulled away from the remaining pipeline 1 (FIG. 8) respectively suspended (FIG. 9) by means of cables 102 and 48. The pipe support 55 is removed by means of cables 102. Hooking on and off of cables 48 and 102 takes place with the ROV 47.

A closing flange 100 is optionally arranged later on flange 5 and falls automatically thereover.

Figure 29:
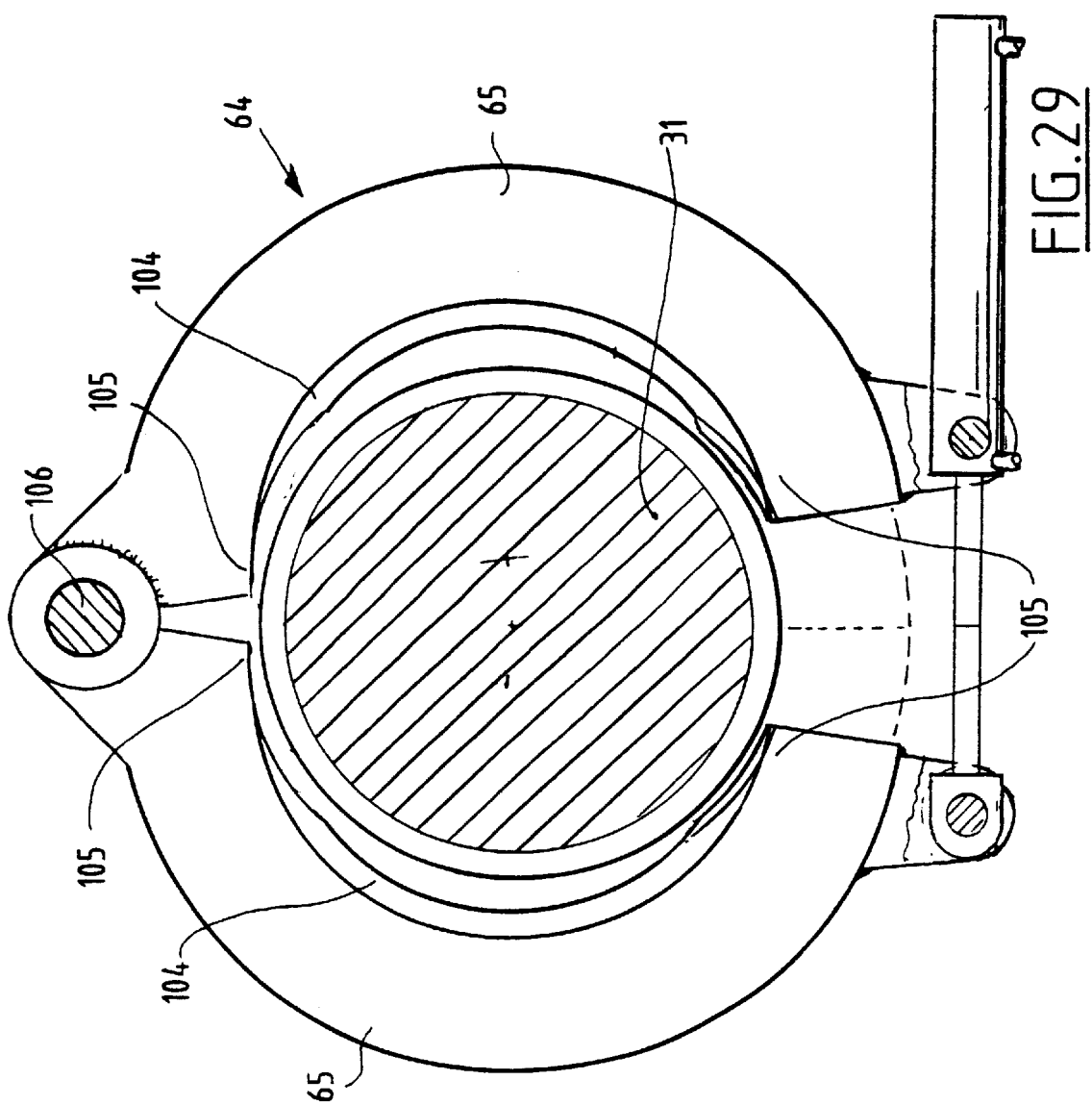
FIGS. 29 and 30 show respectively a cross section and a perspective view of a variant of fraction XXIX of FIG. 27.
Figure 30:
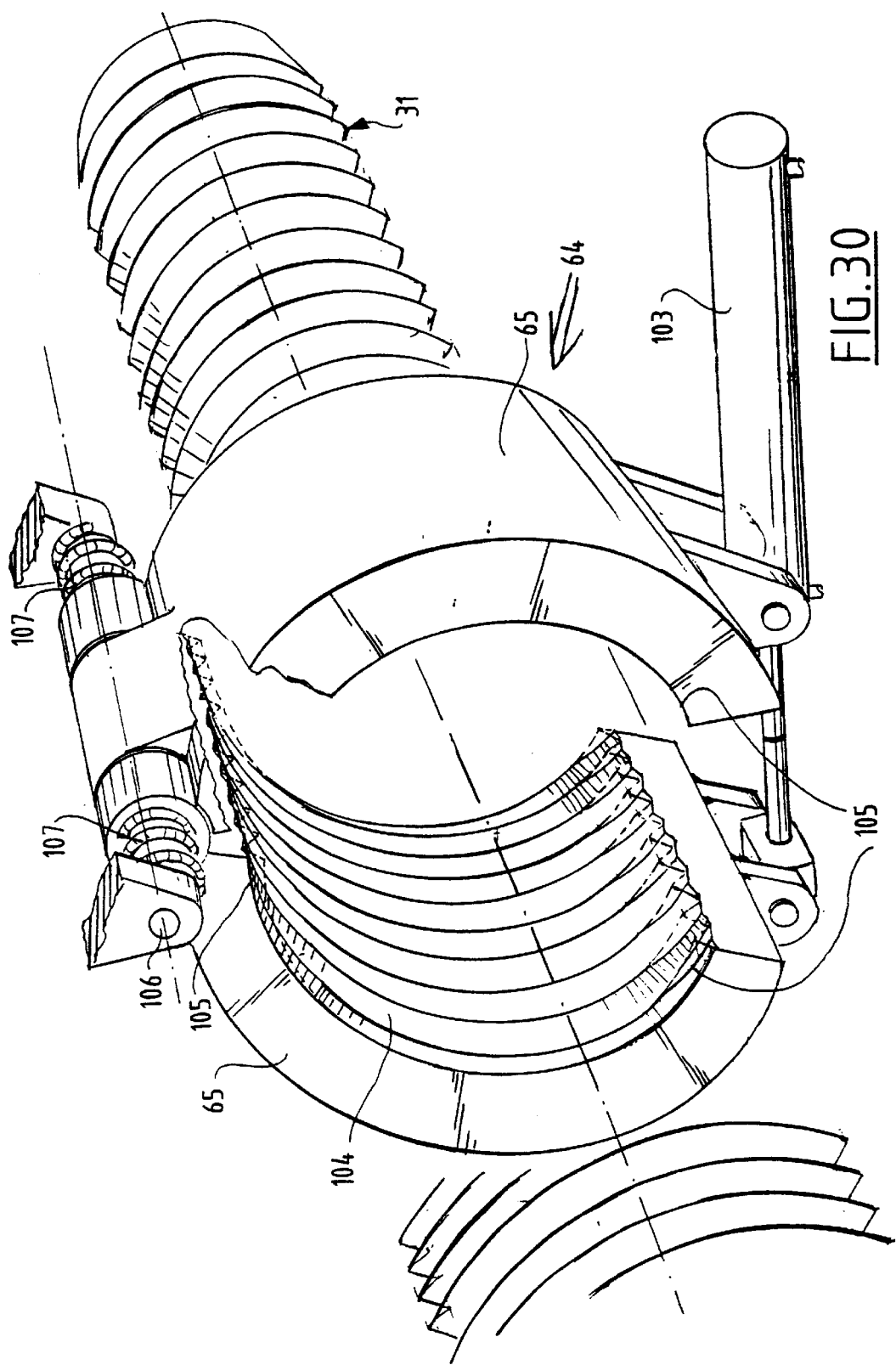
Figure 31:
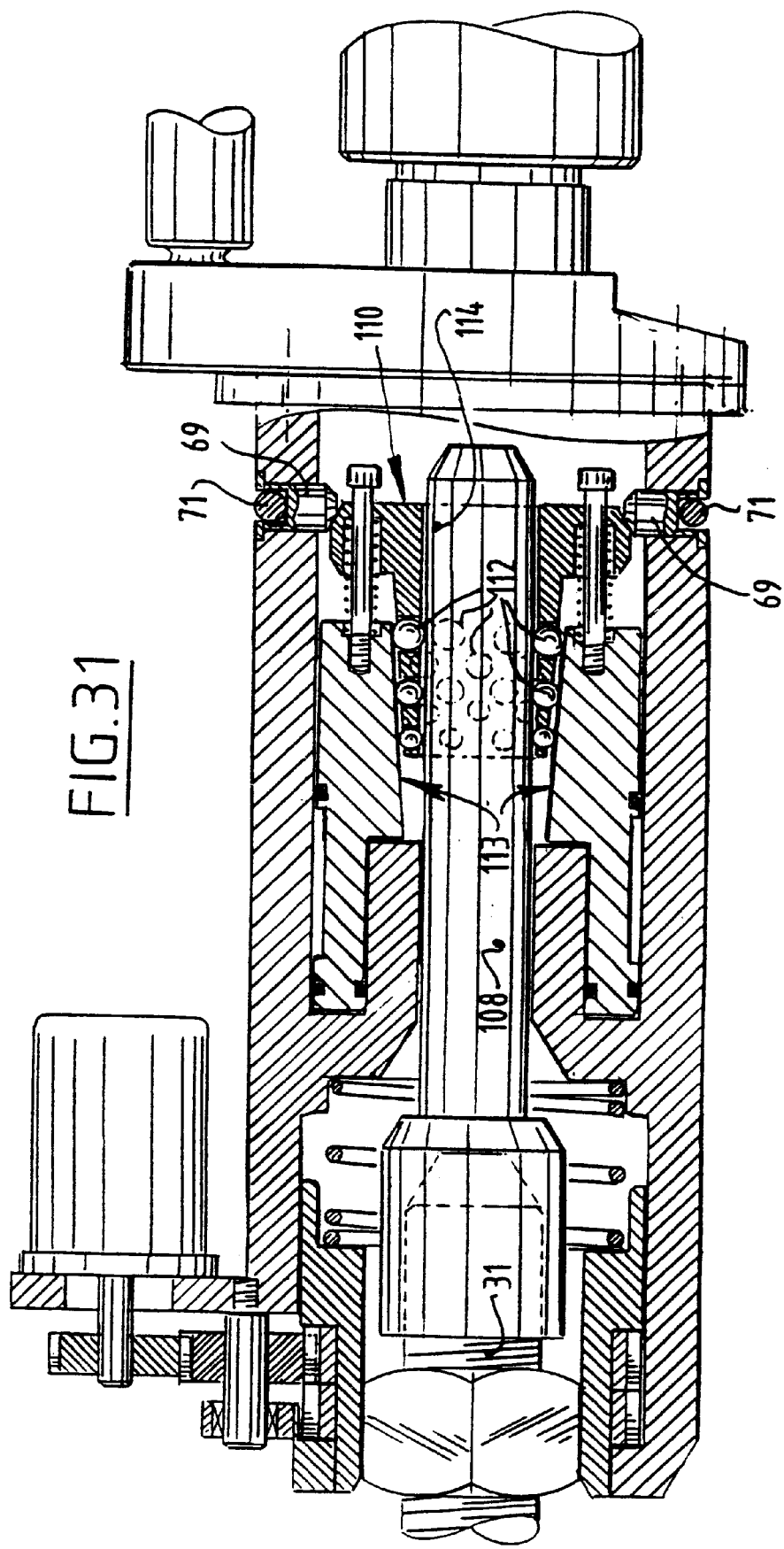
FIG. 31 shows a longitudinal section through an alternative embodiment of FIG. 27.

According to FIGS. 29 and 30 each clamp 64 can consist of two clamping pieces 65 which are embodied as screwed sleeve halves and which are mounted pivotally on a shaft 106 and for axial sliding against pressure springs 107 and which are closed or opened round a screw bolt 31 by a tangential hydraulic cylinder 103. The screw thread 104 is herein ground away at the edges 105.

The control of diverse said members takes place remotely, for instance from an ROV 47 or from a vessel 10 with per se known telecommunication means.

The said hydraulic motors are driven with pressure liquid via liquid lines and remotely operated valves from a pump which is mounted on tool carrier 9 and which is powered by means of a cable from vessel 10 or from a battery built onto tool carrier 9.

Figure 32:
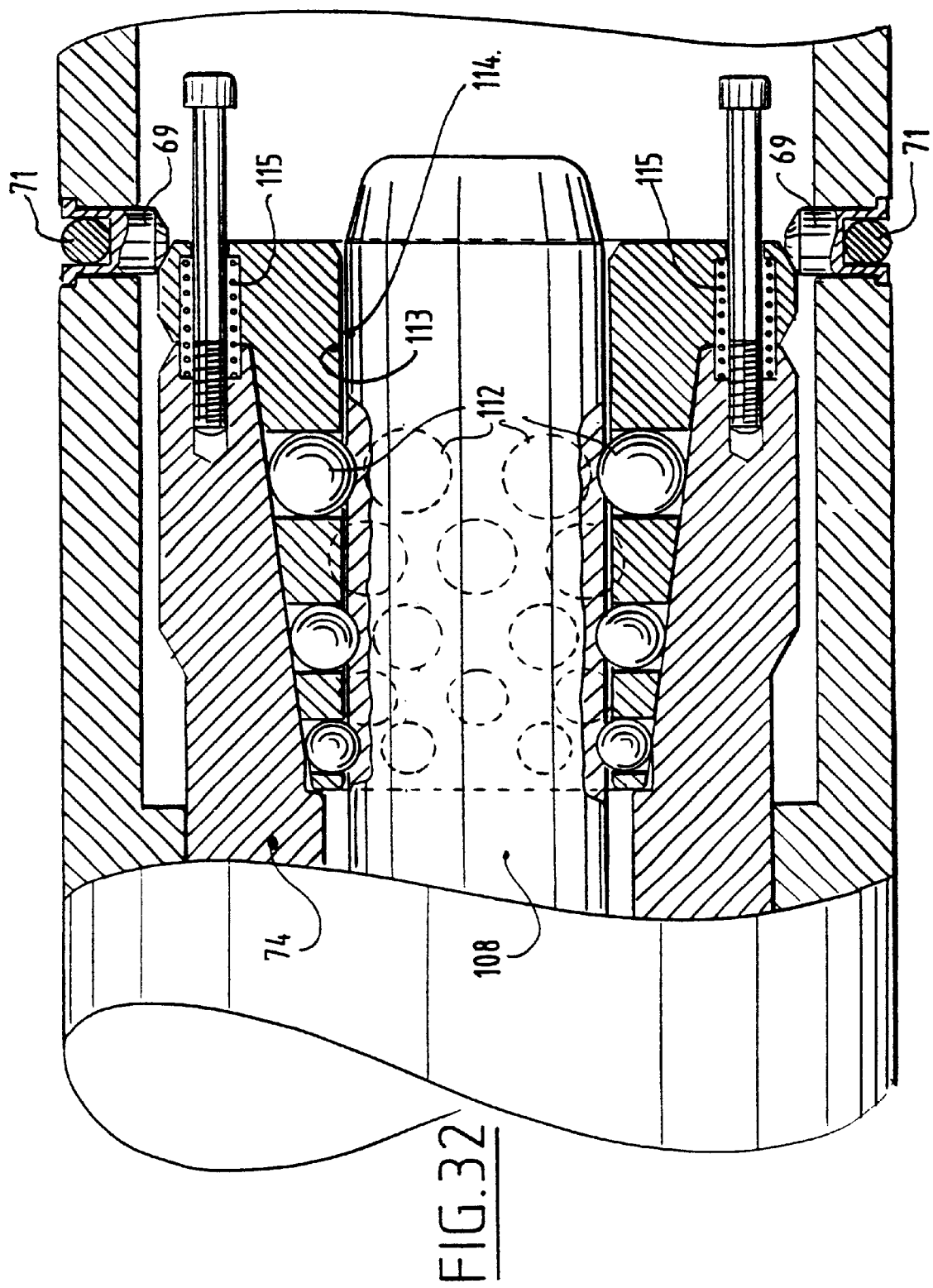
FIG. 32 shows a fraction of FIG. 31 in another position.

In the case of a short screw bolt 31 the screw cap 109 of a bolt extension 108 can be screwed thereon. A clamping device 110 can act thereon which comprises a ball cage 111 with balls 112 received therein which enter clampingly between a wedge surface 113 of piston 74 and the outer face 114 of bolt extension 108 when as according to FIG. 32 the ball cage 111 is held back by radial pins 69 while piston 74 is displaced outward (FIG. 32). When piston 74 is retracted, springs 115 acting between piston 74 and ball cage 111 press the balls out of their wedged position.

Figure 33:
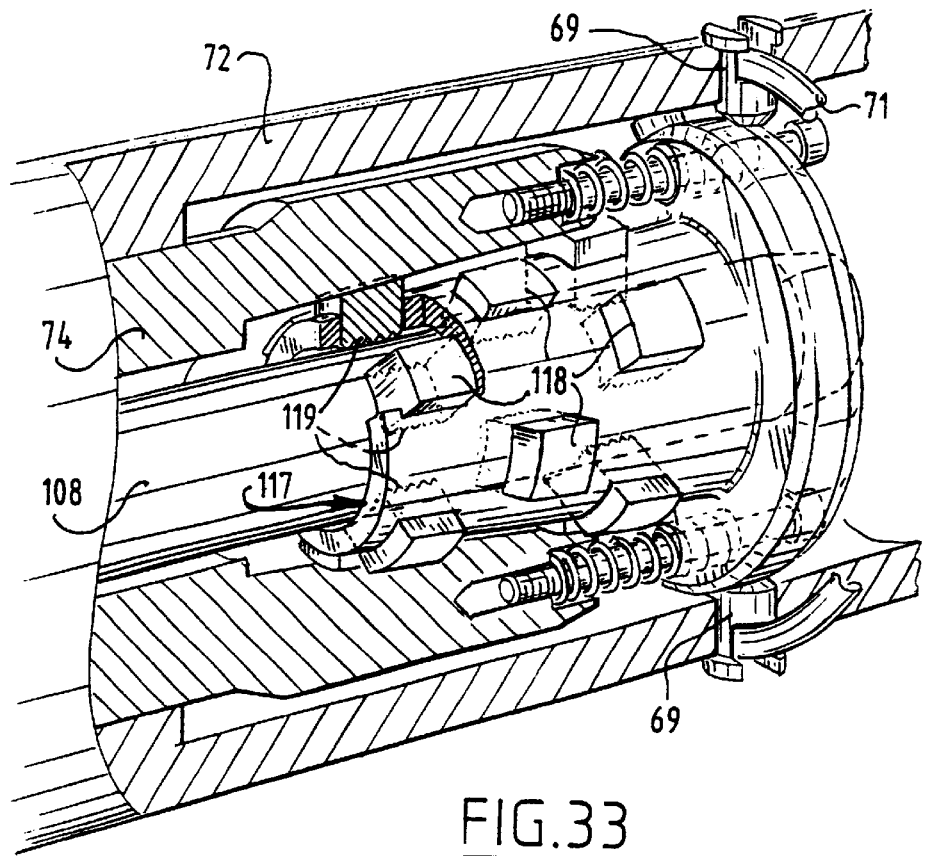
FIG. 33 is a perspective view of the detail of FIG. 32.
Figure 34:
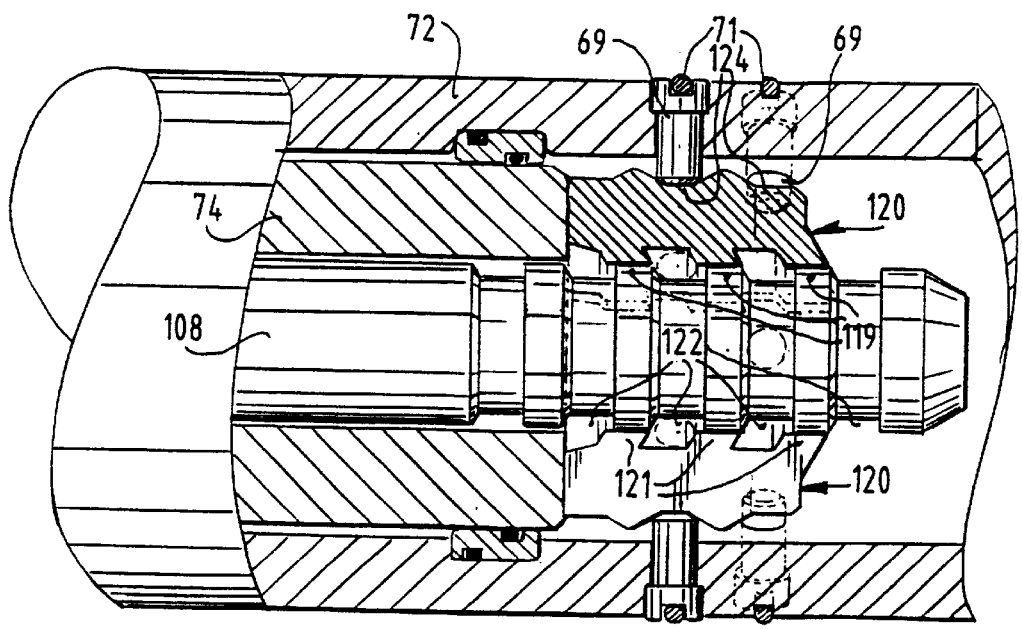
FIG. 34 is a longitudinal section through another alternative of FIG. 32.

FIGS. 33 and 34 each show an alternative of FIG. 32. In FIG. 33 the ball cage 111 is replaced by a sleeve 117 having arranged therein wedge blocks 118 with internal teeth 119 which engage on the smooth stem of the bolt extension 108.

In FIG. 34 the ball cage 111 is replaced by three clamping pieces 120 which are distributed over the periphery and which have shark's tooth-shaped inner ring parts 121 which engage in corresponding grooves 122 of bolt extension 108. Two annular arrays of radial pins 69 co-act with outer grooves 124 of clamping pieces 120 to place them in engagement with grooves 122.

What is claimed is:

1. Method for assembling or disassembling a pipeline present on a seabed, the pipeline having pipe flanges mutually attached by a plurality of nut and bolt connections, the nut and bolt connections being manipulated by at least one wrench, the wrench having an engagement cup for engaging either the nut or bolt of the nut and bolt connections, the engagement cup having an outer ring gear and being displaceable in the axial direction relative to a cup carrier, the cup carrier having a tubular housing with an inner bore and a drive housing enclosing at least one tooth wheel, which includes:

a) Slidably mounting said engagement cup within said tubular housing of said cup carrier, said tubular housing having a spring contacting said engagement cup whereby when said engagement cup is displaced axially relative to said tubular housing to release the nut or bolt, said spring is compressed;

b) Driving said engagement cup in the axial direction by allowing said tooth wheel to engage said outer ring gear of said engagement cup and rotating said tooth wheel;

c) Engaging a predetermined nut and bolt connection of said plurality of nut and bolt connections with said engagement cup;

d) Further driving said engagement cup by rotating said tooth wheel thereby releasing or securing said predetermined nut and bolt combination, said engagement cup moving axially relative to said tooth wheel during driving of said engagement cup.

2. The method of claim 1 wherein the nut or bolt of the nut and bolt combination is displaced by said engagement cup through said spring.

3. The method of claim 1 wherein said wrench is carried by a tool carrier gripping around the pipeline.

4. The method of claim 1 in which said engagement cup is driven in the axial direction by remote control.

5. The method in claim 1 in which the nut and bolt connection is manipulated by the wrench without the use of divers.

6. Apparatus for releasing or securing a nut and bolt connection of an installation present on a seabed, the installation including a pipeline having flanges joined with at least one nut and bolt connection, comprising a wrench having:

a) A cup carrier, said cup carrier comprising a tubular housing having an inner bore and a drive housing;

b) An engagement cup at least partially disposed within said inner bore of said tubular housing, said engagement cup for engaging a nut or bolt head;

c) A spring disposed in said inner bore of said tubular housing, said spring contacting said engagement cup so that when said engagement cup is displaced axially relative to said tubular housing to release the nut or bolt of said nut and bolt connection; said spring is compressed;

d) An outer ring gear disposed around said engagement cup;

e) At least one tooth wheel disposed in said drive housing, said tooth wheel engaging said outer ring gear of said engagement cup whereby when said tooth wheel is driven, said engagement cup is moved axially in relation to said nut and bolt connection thereby releasing or securing said nut and bolt connection.

7. The apparatus of claim 6 wherein the nut or bolt displaced during the releasing or securing of the nut and bolt connection moves through said spring.

8. The apparatus of claim 6 which includes a tool carrier gripping around the pipeline, said tool carrier carrying said wrench.

9. The apparatus of claim 8 in which said wrench is adjustable over an angular distance relative to said tool carrier.

10. The apparatus of claim 8 in which the wrench comprises a clamp for engagement on a bolt of a nut and bolt connection.

11. The apparatus of claim 8 in which said tool carrier with said wrench is built onto a pipe piece of the pipeline releasing or securing the nut and bolt connection and wherein the nut or bolt displaced during the releasing or securing of the nut and bolt connection moves through the spring.

* * * * *